US008007358B2

(12) United States Patent
Linard et al.

(10) Patent No.: US 8,007,358 B2
(45) Date of Patent: Aug. 30, 2011

(54) REGULATED GAMING—MULTI-ACT GAMES

(75) Inventors: Sylvie Linard, London (GB); John Papanastasiou, Croydon (GB); Thierry Brunet De Courssou, Henderson, NV (US)

(73) Assignee: IGT, Reno, NV (US)

( * ) Notice: Subject to any disclaimer, the term of this patent is extended or adjusted under 35 U.S.C. 154(b) by 1307 days.

(21) Appl. No.: 11/562,915

(22) Filed: Nov. 22, 2006

(65) Prior Publication Data

US 2007/0142108 A1 Jun. 21, 2007

Related U.S. Application Data

(60) Provisional application No. 60/738,812, filed on Nov. 22, 2005.

(51) Int. Cl.
*A63F 9/24* (2006.01)
(52) U.S. Cl. .................... 463/20; 463/16; 463/22
(58) Field of Classification Search .......... 463/16, 463/20
See application file for complete search history.

(56) References Cited

U.S. PATENT DOCUMENTS

| | | | |
|---|---|---|---|
| 4,593,904 A | 6/1986 | Graves | |
| 4,695,053 A | 9/1987 | Vazquez, Jr. et al. | |
| 5,342,049 A | 8/1994 | Wichinsky et al. | |
| 5,823,873 A | 10/1998 | Moody | |
| 6,012,983 A | 1/2000 | Walker et al. | |
| 6,019,374 A | 2/2000 | Breeding | |
| 6,050,895 A | 4/2000 | Luciano, Jr. et al. | |
| 6,077,163 A | 6/2000 | Walker et al. | |
| 6,244,957 B1 | 6/2001 | Walker et al. | |
| 6,267,669 B1 | 7/2001 | Luciano, Jr. et al. | |
| 6,283,474 B1 | 9/2001 | de Keller | |
| 6,288,993 B1 * | 9/2001 | Kawahara et al. ............ 720/652 |
| 6,315,660 B1 * | 11/2001 | DeMar et al. .................. 463/16 |
| 6,409,597 B1 | 6/2002 | Mizumoto | |
| 6,500,068 B2 * | 12/2002 | Walker et al. .................. 463/25 |
| 6,517,433 B2 | 2/2003 | Loose et al. | |
| 6,522,312 B2 | 2/2003 | Ohshima et al. | |
| 6,761,632 B2 | 7/2004 | Bansemer et al. | |

(Continued)

FOREIGN PATENT DOCUMENTS

JP 2007307305 A * 11/2007

(Continued)

OTHER PUBLICATIONS

Nintendo, Pipe Dream Instruction Manual, Copyright 1988, pp. 1-17.*

(Continued)

*Primary Examiner* — David L Lewis
*Assistant Examiner* — Chase Leichliter
(74) *Attorney, Agent, or Firm* — Young Law Firm, P.C.

(57) ABSTRACT

Creative multi-act games for the younger generation of casino players accustomed to creative simulation games such as "The Sims®" and familiar TV characters such as the cast of "Friends". Stories unfold through acts that have been staged by the player by selecting and placing acting objects. A palette of betting opportunities may be provided in each act in accordance with the staged act to allow the player(s) to place bets. A typical storyboard may include three acts: (a) a construction act, (b) a testing act and (c) a destruction or resolution act. The unfolding of acts may be non-linear and several players may participate simultaneously, sharing the opportunity to affect a storyboard's direction through decision-making.

46 Claims, 21 Drawing Sheets

U.S. PATENT DOCUMENTS

| | | | |
|---|---|---|---|
| 6,761,633 B2 * | 7/2004 | Riendeau et al. | 463/16 |
| 6,811,482 B2 | 11/2004 | Letovsky | |
| 6,893,341 B2 * | 5/2005 | Walker et al. | 463/9 |
| 6,991,539 B2 | 1/2006 | Pacey | |
| 7,431,645 B2 * | 10/2008 | Han et al. | 463/16 |
| 7,556,561 B2 | 7/2009 | White et al. | |
| 7,674,176 B2 * | 3/2010 | Berman et al. | 463/20 |
| 2002/0053089 A1 * | 5/2002 | Massey | 725/135 |
| 2002/0147040 A1 | 10/2002 | Walker et al. | |
| 2003/0211881 A1 | 11/2003 | Walker et al. | |
| 2004/0102238 A1 | 5/2004 | Taylor | |
| 2004/0217548 A1 | 11/2004 | Snow | |
| 2005/0040601 A1 * | 2/2005 | Yoseloff et al. | 273/292 |
| 2005/0071023 A1 * | 3/2005 | Gilliland et al. | 700/91 |
| 2005/0164793 A1 | 7/2005 | Merimovich et al. | |
| 2005/0192091 A1 * | 9/2005 | Siewert et al. | 463/31 |
| 2005/0239528 A1 | 10/2005 | Moody | |
| 2005/0245307 A1 * | 11/2005 | Gatto et al. | 463/16 |
| 2006/0003832 A1 * | 1/2006 | Mincey et al. | 463/25 |
| 2006/0276243 A1 | 12/2006 | Reisdorff et al. | |

FOREIGN PATENT DOCUMENTS

| | | |
|---|---|---|
| WO | WO0141892 A2 | 6/2001 |

OTHER PUBLICATIONS

Jaibo Software, Pipe Fun, Copyright 2000-2002, pp. 1-4.*
International Search Report mailed Sep. 26, 2007, in related International Application No. PCT/US06/61226, filed Nov. 22, 2006.
Written Opinion mailed Sep. 26, 2007, in related International Application No. PCT/US06/61226, filed Nov. 22, 2006.
USPTO Office Action Sep. 10, 2010 in related U.S. Appl. No. 12/043,141.
USPTO Office Action of Sep. 8, 2010 in related U.S. Appl. No. 12/043,957.

* cited by examiner

| | |
|---|---|
| ACT 1 | ESTABLISH THE PREMISE |

| | |
|---|---|
| ACT 2 | TEST THE PREMISE |

| | |
|---|---|
| ACT 3 | RESOLUTION |

*FIG. 2*
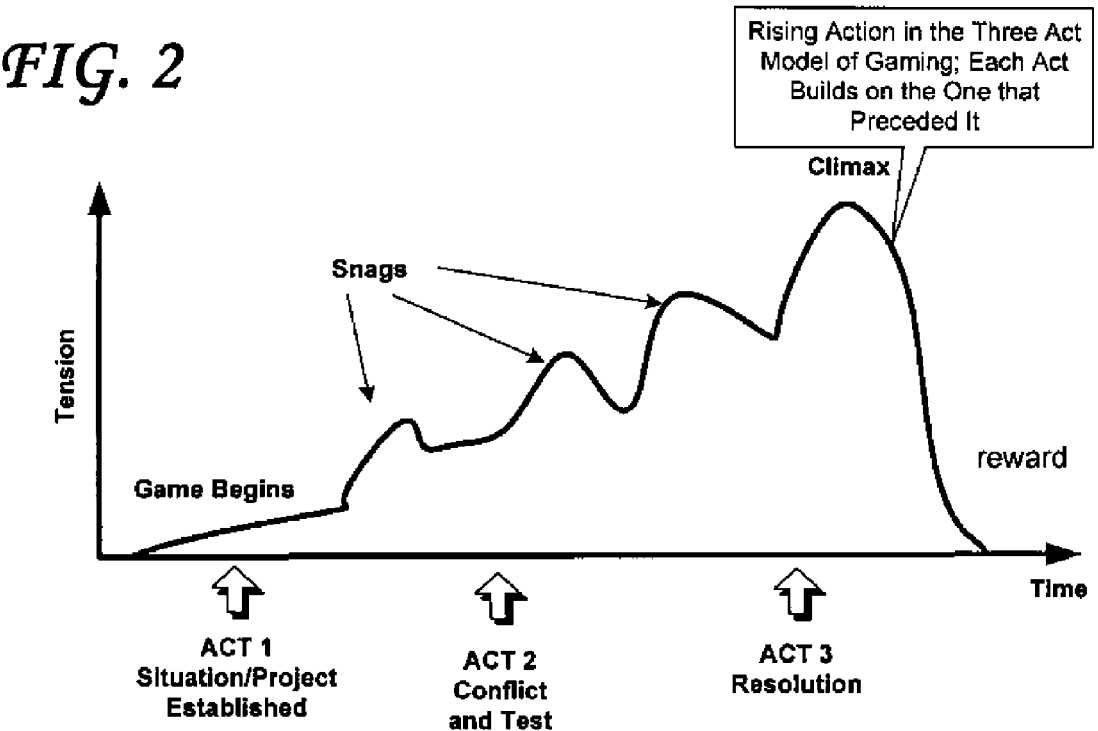
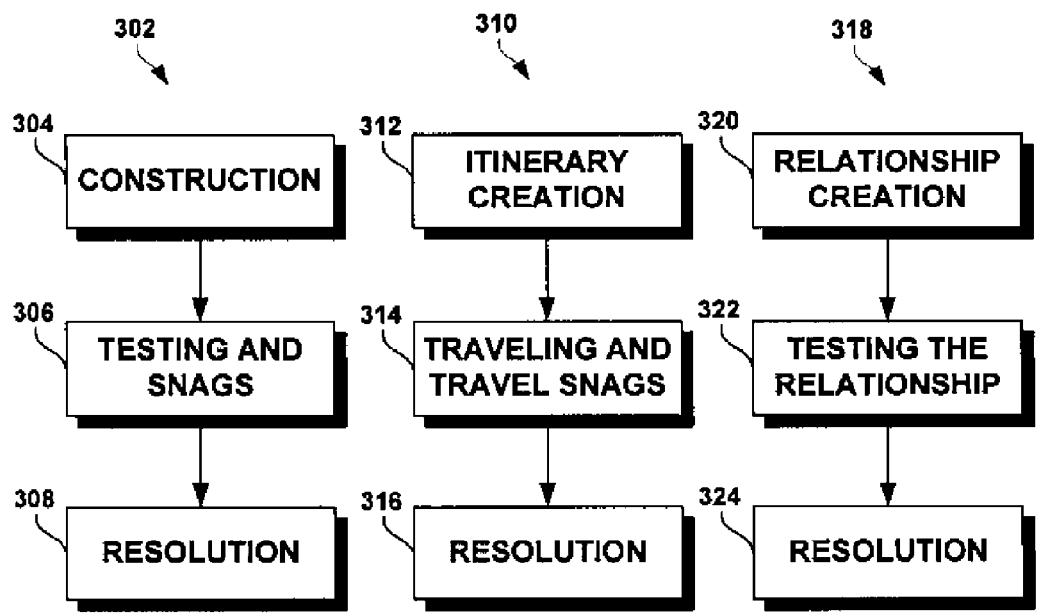
*FIG. 3*

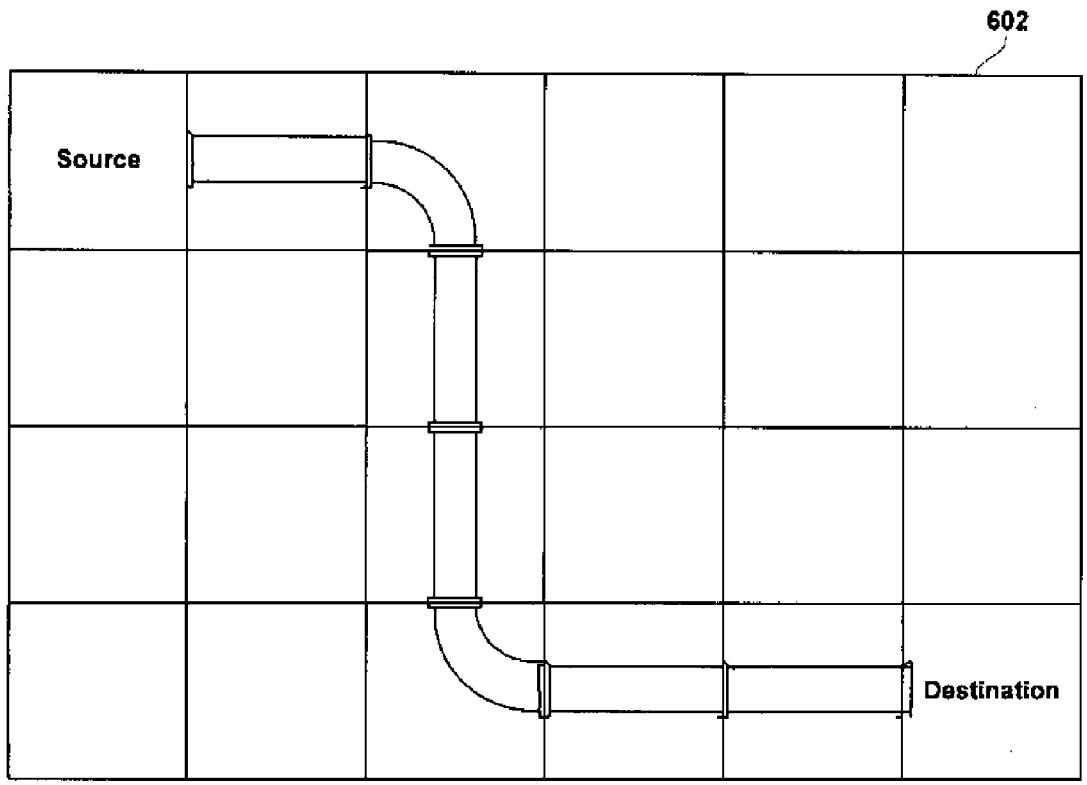
FIG. 6
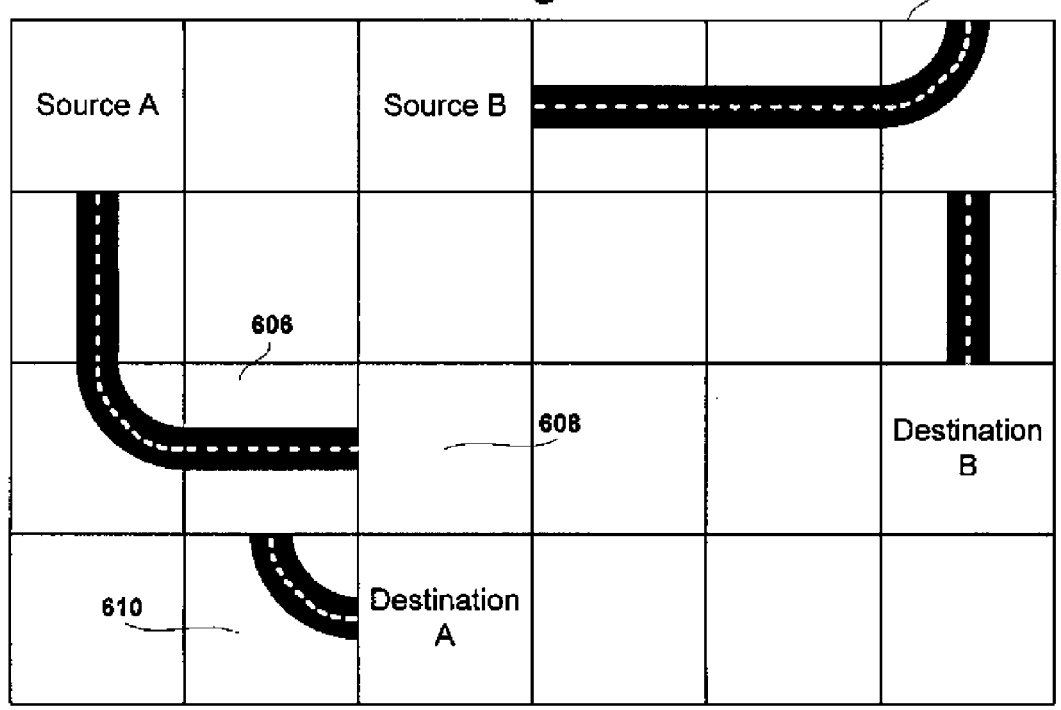

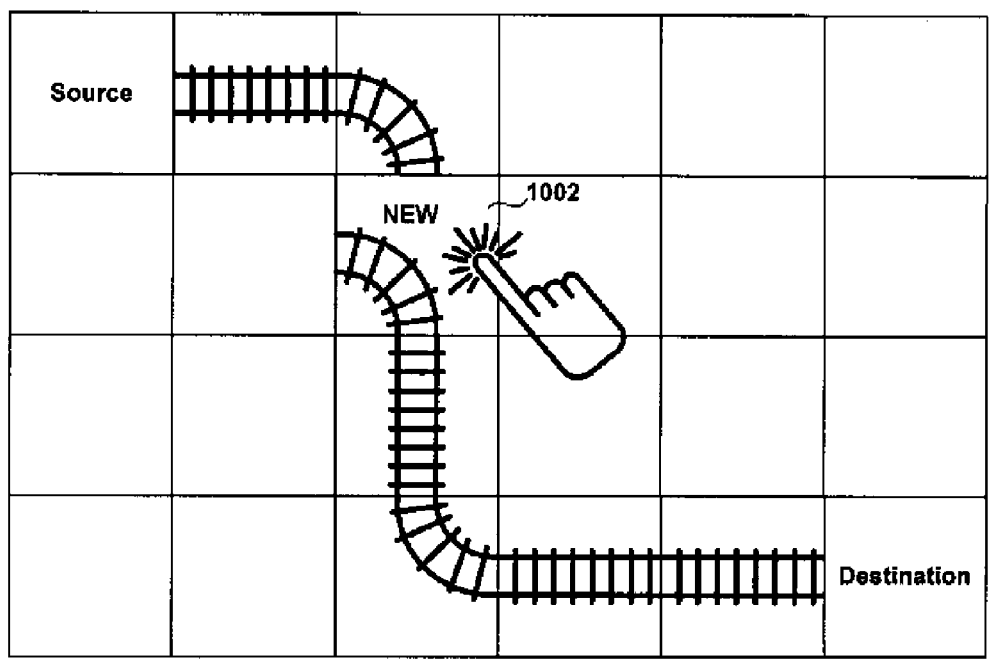
FIG. 10
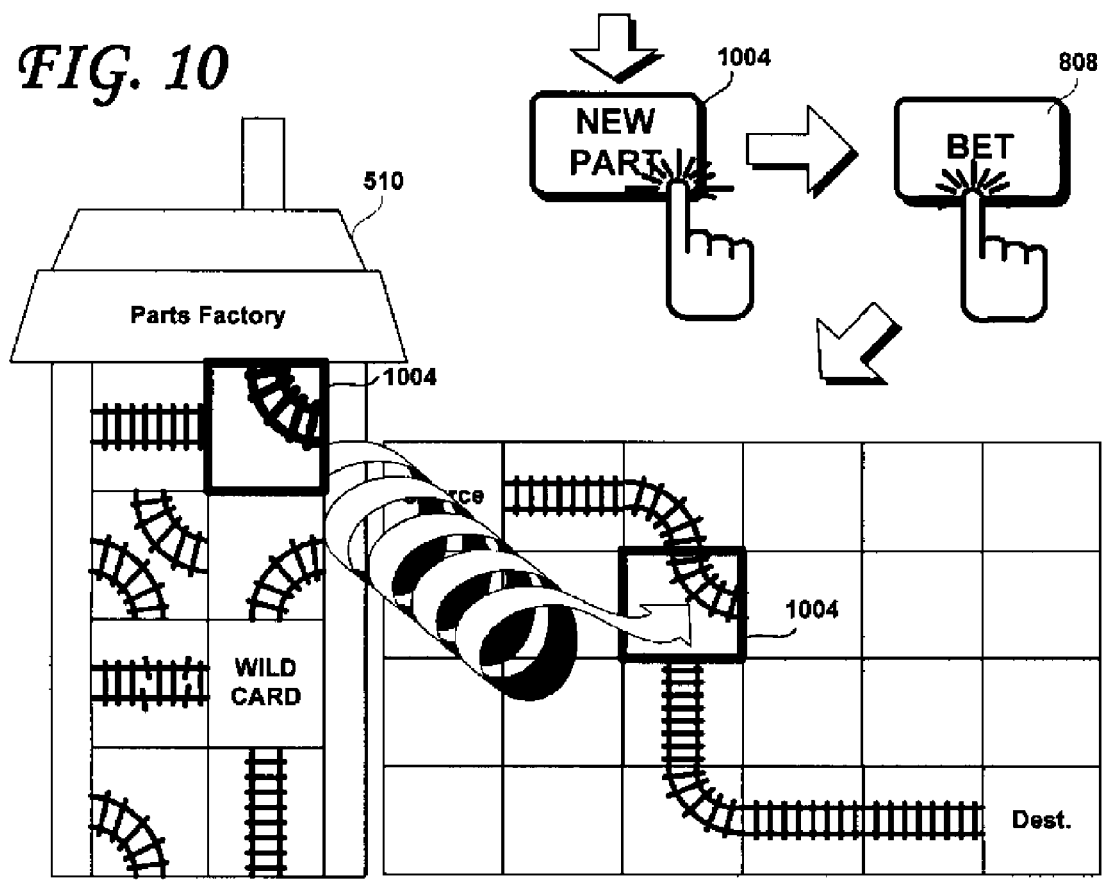

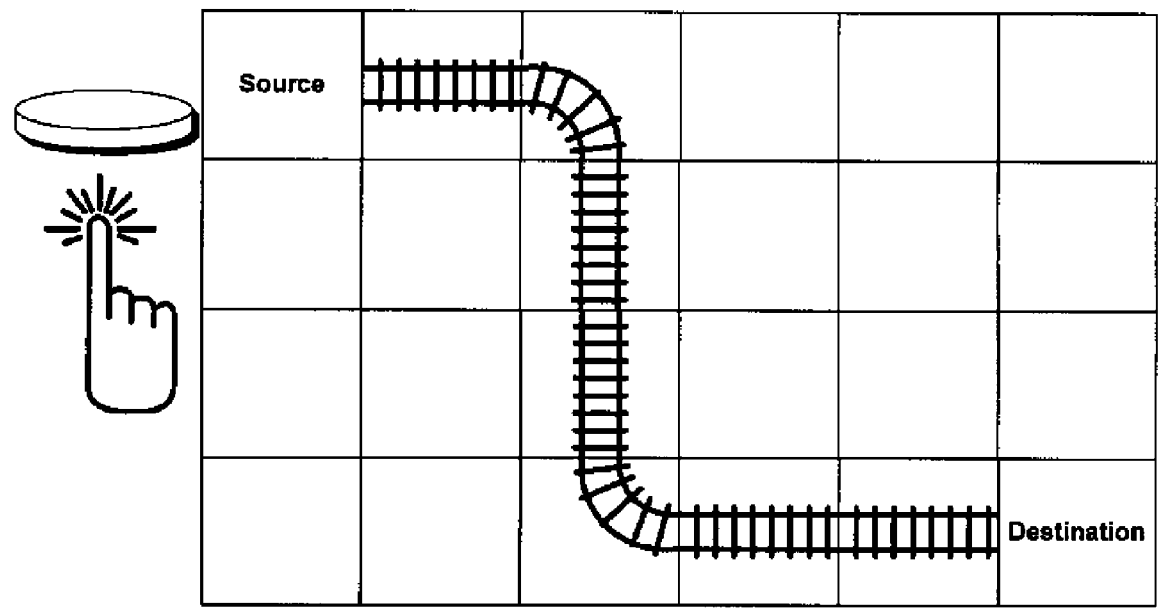
*FIG. 11*
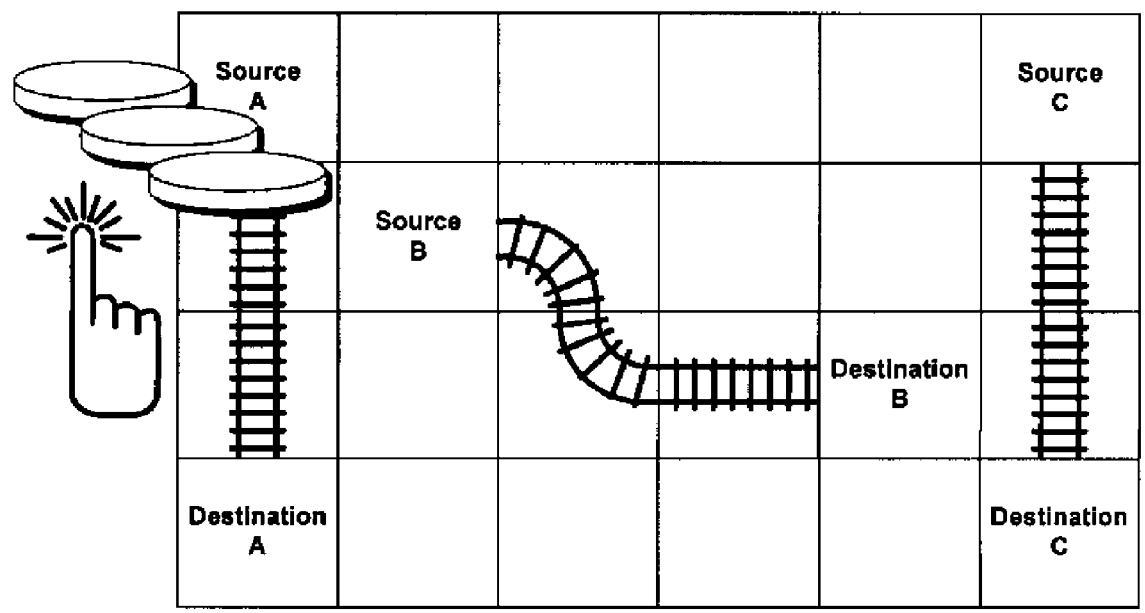

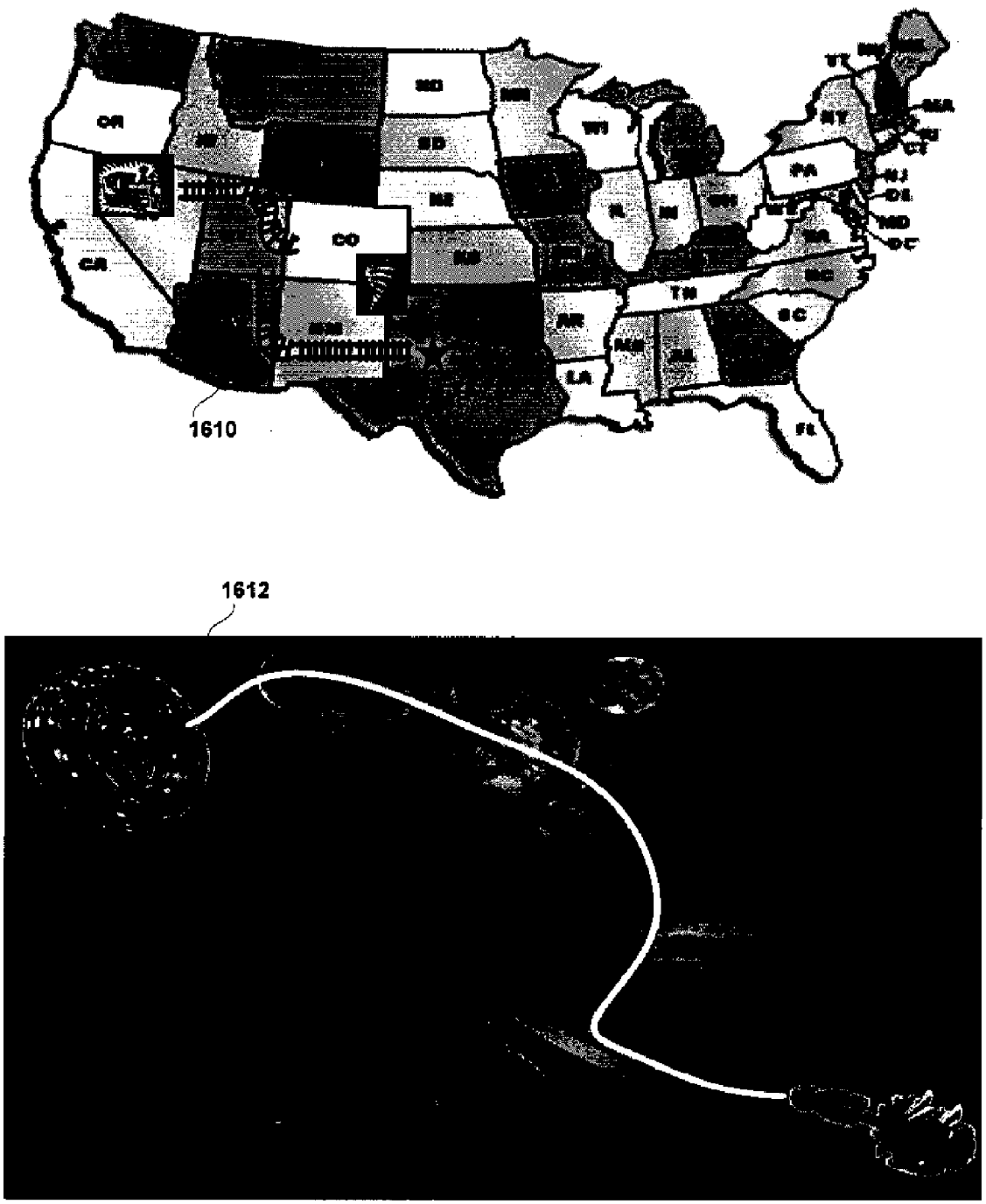
FIG.
16B

REGULATED GAMING—MULTI-ACT GAMES

CROSS REFERENCE TO RELATED CASES

This application claims the benefit under 35 U.S.C. §119 (e) of Provisional Application Ser. No. 60/738,812, filed Nov. 22, 2005, and is related to the application filed on even date herewith entitled, "REGULATED GAMING-STAGING MULTI-ACT GAMES", both applications of which are hereby incorporated herein by reference in their entireties.

BACKGROUND OF THE INVENTION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings referred to herein: Copyright 2005, Cyberscan Technology, Inc., All Rights Reserved.

FIELD OF THE INVENTION

This invention relates generally to the field of regulated pay computer-controlled games, either games of skill or games of chance.

DESCRIPTION OF THE PRIOR ART AND RELATED INFORMATION

The majority of computer games of chance such as found in casinos are based on, or directly derived from, reel slot machines or video poker. Many of the new generation of video slot machines have captured the public's imagination and betting dollars by replacing the fruit and poker symbols of the past with colorful, larger-than-life characters and by adding new and exciting features like multi-line play, secondary game play, wide-area progressive jackpots and rich animation sequences. While generally not as visually appealing as the new slot machines, video poker machines remain popular because they afford the player the ability to use skill and decision-making to affect the game's outcome. Interestingly, despite achieving tremendous popularity in the home video gaming market, puzzle video games like Tetris®, Bejeweled®, or strategy/construction simulation games such as SimCity®, or role simulation games such as the Sims®, which are also based on skill and decision-making, have made no inroads into the casino electronic game arena. These games are far too complex or culturally remote for slot managers or legacy game manufacturers to consider offering them to the current generation of casino players.

SUMMARY OF THE INVENTION

According to an embodiment thereof, the present invention may be viewed as a pay game of chance or skill that includes a plurality of acts (e.g., two or more) consistent with a predetermined storyboard. The game unfolds a story through acts staged by the player by selecting and placing acting objects. A palette of betting opportunities is proposed in each act in accordance with the staged act allowing players to place bets on one or more randomly drawn events within each act.

According to further embodiments, the acts may be caused to unfold sequentially. Alternatively, the acts may be caused to unfold in a non-sequential order. Each of the acts may be associated with a sequence identifier and the acts may be caused to unfold in a sequential order, a non-sequential order, a random sequence order or an order selected by the player. Alternatively still, each of the acts may be associated with a sequence identifier and the acts may be caused to unfold in a sequence order consistent with a randomly drawn outcome, a bonus outcome and/or a mystery outcome, for example.

The game may be played on a gaming machine coupled to a network of a plurality of other gaming machines having the same or a similar game. Each of the acts may be associated with a sequence identifier and the acts may be caused to unfold in a sequence order consistent with a randomly drawn outcome occurring on another gaming machine. Betting opportunities may be presented, for example, via a pop-up palette or in a roll-up panel palette. Betting opportunities are preferably consistent with the storyboard. Wager amounts to be placed on the betting opportunities may be presented, for example, via a pop-up Palette of Chips or in a roll-up panel Palette of Chips. The Palette of Chips may be consistent with the storyboard.

There may be at least one Palette of Betting Opportunities for each act, and each palette may represent a different theme consistent with the storyboard. There may be at least one Palette of Chips for each Palette of Betting Opportunities.

The storyboard may include a quest game, an adventure game, a strategy game, a role game and/or construction game, to name but a few possibilities.

For example, the acts may include, consistent with selected storyboard that may include a plurality of acts such as, for example:

(a) Construction, (b) Testing and (c) Destruction;
(a) Itinerary creation, (b) Traveling and (c) Travel snags or difficulties;
(a) Creating a relationship, (b) Living the relationship, (c) Complications affecting the relationship;
(a) Selecting players, their personality and their gaming style for a (e.g., Poker) game and (b) playing the Poker game;
(a) Establish the premise; (b) Unfold the premise, (c) Complicate the premise, and (d) Resolution of the premise. Other acts may be developed and implemented, as the foregoing list is not intended to limit the range of possibilities falling within the scope of the present inventions.

For example, the construction act may include an assembly of (e.g., water) pipes from a part factory, the testing act may include a step or steps of causing water to flow into the water pipes constructed during the construction act, and the destruction act may include the destruction act may include the pipes failing through bursting by freezing, accidental drilling through a pipe, corrosion, seal cracking and like calamities.

One or more of the acts may include a "Mystery Snag" Palette of betting Opportunities, which may include any problem, difficulty, manmade or natural disaster, complication and the like on which the player may pace a bet.

According to a still further embodiment, the present invention is a pay game of chance or skill that includes a plurality (i.e., two or more) of acts in which at least one Palette (available range) of Betting Opportunities allowing placing bets on a plurality of events may be offered for each act and in which the placed bets are played for each act.

Accordingly, an embodiment of the present invention is a computer-controlled game that may include a computer; at least one display; a storyline that unfolds toward completion on the display(s) as controlled by the computer, the storyline including a plurality of individually selectable acts, each but a first one of the plurality of acts being configured to build on at least one preceding act to provide continuity between the plurality of acts; a palette of betting opportunities, the palette of betting opportunities being configured to dynamically appear on the at least one display screen within at least one of the plurality of acts; an interface configured to enable a player to select a betting opportunity from the palette of betting opportunities and to enable placement of a bet on the selected betting opportunity, and a random number generator coupled to the computer and configured for randomly determining an outcome related to the bet placed subsequent to the player activating a bet command.

Game play may takes place on two grids displayed on the display(s). A first of the two grids may include the palette of betting opportunities to offer potential betting opportunities to the player. The second of the two grids may include a game play grid on which the storyline unfolds. The plurality of acts may include a first act, a second act and a third act and the storyline may be established in the first act, tested in the second act and resolved in the third act. The game play grid may be fragmented in a regular or in an irregular manner. The game play grid may be three-dimensional. The game play grid may include a plurality of grid segments and each of the plurality of grid segments may, for example, represent a province or a territory (or other geographical or geopolitical entity) within a map.

For example, the storyline may include an unfolding of a construction project. The plurality of acts may include a first act, a second act and a third act and the first act of the construction project may include establishing the construction project, the second act of the construction project may include testing the construction and introducing and overcoming construction snags and the third act of the construction project may include resolving the construction project. The construction project may include completing a road, a pipeline, railroad tracks, wiring, a river, a labyrinth and/or an ignition cord, for example. The storyline may include an unfolding of a construction project and the palette of betting opportunities may include a parts factory. The parts factory may include project segments that are movable by the player into the game play grid to complete or improve projects. The palette of betting opportunities may include a plurality of natural or man made calamities that may damage or destroy the construction project. The plurality of natural or man made calamities may include, for example, a tornado, an earthquake, an explosion, lightning and/or a tsunami, for example. Each of the natural or man made calamities within the palette of betting opportunities may be configured to be wagered upon by the player. When the computer, with input from the random number generator, determines that a natural or man made calamity upon which the player has wagered will damage the construction project, the player's wager may be considered a win and the player may be rewarded. The interface may be configured to enable the player to bet (or wager, as the two terms are used interchangeably herein) on a selected betting opportunity of the palette of betting opportunities by at least one of: a) touching the selected betting opportunity and pressing a bet button; b) placing an onscreen wagering (or betting, as the two terms are used interchangeably herein) chip on the selected betting opportunity; and c) associating a selected grid segment of the game play grid with the selected betting opportunity and pressing a bet button.

Alternatively, the storyline may include construction of at least one conduit that must be aligned correctly to allow a liquid or an object to move within the conduit from a predetermined source to a predetermined destination. A game play grid may be provided on which the storyline unfolds. The game play grid may include a plurality of game play grid segments and the conduit may be divided into a plurality of conduit segments by the game play grid to enable the player to manipulate the conduit one conduit segment at a time. The plurality of acts may include a testing act in which the liquid or object begins advancing towards the predetermined destination. The computer, with input from the random number generator, may be configured to randomly place the conduit segments in the game play grid and to enable the player to modify the placement of the conduit segments in the game play grid to complete the conduit and the player may earn a reward when the liquid or object successfully advances through the completed conduit from the predetermined source to the predetermined destination. One or more of the plurality of conduit segments may be faulty, which causes leakage or inefficient transportation when the conduit is completed and which may cause the player to earn a smaller reward than would be the case if none of the plurality of conduit segments were faulty. Incorrectly aligned or missing segments in a conduit may halt or slow down an advance of the liquid or of the object, which may cause failure of the construction of the conduit and the player to earn no reward. A rotate command may be provided and configured to enable the player to rotate misaligned conduit segments in the game play grid. A draw command may be provided and configured to enable the player to replace missing or misaligned conduit segments with new conduit segments. The storyline may include a concurrent construction of more than one conduit. The storyline may be configured to enable the player to attempt to fix missing or incorrectly aligned conduit segments only within a predetermined time period. The predetermined time period may be determined by the time it takes an object or liquid to travel from the predetermined source to the predetermined destination. A published pay table may be stored in the computer and the interface may be further configured to enable the player to place side wagers on one or more designated game play grid segments such that when a random layout of the conduit segments on the game play grid causes a conduit segment to pass through one or more of the designated game play grid segments, the player's side wager may be considered a win and the player may be given a reward based on the published pay table. The interface may be further configured to enable the player to designate game play grid segments on which to place a side bet by selecting a side bet wager shape from a palette of a plurality of side bet wager shapes and by applying the selected side bet wager shape to the game play grid. The interface may be further configured to enable the player to define new side bet wager shapes. At least one of the displays may be a touch screen and the interface may be further configured to enable the player to define the new side bet wager shapes by selecting a drawing tool from a palette of options and using the selected drawing tool on the touch screen to draw side bet wager shapes within the game play grid.

Alternatively still, the storyline may include a journey of an onscreen character. The plurality of acts may include at least a first act, a second act and a third act and the first act may include a creation of a travel itinerary, the second act may include traveling on the journey along the created travel itinerary and overcoming travel snags (i.e., difficulties, problems, obstacles) and the third act may include a resolution of the journey. Alternatively still, the journey may include, for example, a hero's quest and/or a military mission. The journey may include an emotional journey or a creation of a relationship. The plurality of acts may include at least a first act, a second act and a third act and the first act may include the creation of the relationship, the second act may include testing the relationship and the third act may include resolving the relationship. For example, the relationship may be or include a romantic relationship.

Each of the plurality of acts may be associated with a unique setting (or stage, as the two terms are equivalent) that may be displayed (or stage) on the at least one display. The computer may be configured to be coupled to a computer of another computer-controlled game to form a gaming network. The computer may be configured to be linked to the computer of the other computer-controlled game via a broadband connection. The interface may be further configured to enable the player to invite a player of the other computer-controlled game to participate in the storyline.

According to another embodiment thereof, the present invention is also a computer-controlled game. The computer controlled game may include a computer; at least one display; at least one storyline that unfolds toward completion as controlled by the computer, the storyline including a plurality of acts and including a depiction of a liquid or an object attempting to travel from a predetermined source toward a predetermined destination through a conduit shown on the at least one display, the conduit including a plurality of conduit segments; a palette of betting opportunities appearing on the at least one display within each of the plurality of acts; an interface configured to enable a player to selectively alter attributes of selected ones of the plurality of conduit segments and to enable the player to select a betting opportunity from the palette of betting opportunities and to selectively place a bet on the selected betting opportunity, and a random number generator coupled to the computer and configured for randomly determining an outcome related to the bet placed subsequent to the player activating a bet command.

The attributes may include a position of a conduit segment and/or an orientation of a conduit segment, for example. Game play may take place on a first onscreen grid and/or on a second onscreen grid. The first and/or second onscreen grids may include the palette of betting opportunities, the palette of betting opportunities being configured to offer a plurality of betting opportunities to the player. The first onscreen grid may include a game play grid in which the storyline unfolds. The plurality of acts may include a first act in which the storyline may be established, a second act in which the storyline may be tested and a third act in which the storyline may be resolved. The game play grid may be fragmented in a regular or in an irregular manner. The game play grid may be three-dimensional. The game play grid may include a plurality of grid segments and each of the plurality of grid segments may represent a province, state, district or a territory within a map. The storyline may include an unfolding of a conduit construction project to construct the conduit from the plurality of conduit segments. The plurality of acts may include a first act, a second act and a third act and the first act of the conduit construction project may include establishing the conduit construction project, the second act of the conduit construction project may include testing the constructed conduit and introducing and overcoming construction snags and the third act of the conduit construction project may include resolving the conduit construction project.

The storyline may include an unfolding of a conduit construction project and the palette of betting opportunities may include a parts factory. The parts factory may include project segments that are movable into the game play grid to complete or improve the conduit. The palette of betting opportunities may include a plurality of natural or man made calamities that may damage or destroy the conduit construction project. The plurality of natural or man made calamities may include, for example, a tornado, an earthquake, an explosion, lightning and/or a tsunami. The plurality of natural or man made calamities may be configured to be wagered upon by the player. When the computer, with input from the random number generator, determines that a natural or man made calamity upon which the player has wagered will damage the construction project, the player's wager may be considered a win and the player may be rewarded.

The interface may be configured to enable the player to bet on a selected betting opportunity of the palette of betting opportunities by a) touching the selected betting opportunity and pressing a bet button; b) placing an onscreen wagering chip on the selected betting opportunity and/or c) associating a selected grid segment of the game play grid with the selected betting opportunity and pressing a bet button. The interface may be further configured to enable the player to manipulate the conduit one segment conduit at a time. The plurality of acts may include a test act during which the liquid or object begins advancing within the conduit towards the predetermined destination. The computer, with input from the random number generator, may be configured to randomly place the conduit segments in the game play grid and to enable the player to modify the placement of the conduit segments in the game play grid to complete the conduit and the player may earn a reward when the liquid or object successfully advances through the completed conduit from the predetermined source to the predetermined destination. One or more of the plurality of conduit segments may be faulty, which may cause leakage or inefficient transportation when the conduit is completed and which may cause the player to earn a smaller reward than would be the case if none of the plurality of conduit segments were faulty. Incorrectly aligned or missing conduit segments may halt (or slow down) the advance of the liquid or object through the conduit, which may cause failure of the conduit and the player to earn no reward. A rotate command may be provided and configured to enable the player to rotate misaligned conduit segments in the game play grid. A draw command may be provided and configured to enable the player to replace missing or misaligned conduit segments with new conduit segments in the game play grid. The storyline may include a concurrent construction of more than one conduit. The storyline may be configured to enable the player to attempt to fix missing or incorrectly aligned conduit segments within the game play grid only within a predetermined time period. The predetermined time period may be determined by the time it takes the liquid or object to travel from the predetermined source to the predetermined destination. A published pay table may be stored in the computer and the interface may be further configured to enable the player to place side wagers on one or more designated game play grid segments such that when a random layout of the conduit segments on the game play grid causes a conduit segment to pass through one or more of the designated game play grid segments, the player's side wager may be considered a win and the player may be given a reward based on the published pay table.

The interface may be further configured to enable the player to designate game play grid segments on which to place a side bet by selecting a side bet wager shape from a palette of a plurality of side bet wager shapes and by applying the selected side bet wager shape to the game play grid. The interface may be further configured to enable the player to define new side bet wager shapes. The or each display may be a touch screen and the interface may be further configured to enable the player to define the new side bet wager shapes by selecting a drawing tool from a palette of options and using the selected drawing tool on the touch screen to draw side bet wager shapes within the game play grid. Each of the plurality of acts may be associated with a unique setting that may be displayed on the display(s). The computer may be configured to be coupled to a computer of another computer-controlled game to form a gaming network over, for example, a broadband connection. The interface may be further configured to enable the player to invite a player of the other computer-controlled game to participate in the storyline.

According to still another embodiment, the present invention is a computer-implemented method for providing a player with an electronic game of chance. The method may include steps of displaying a storyline that unfolds to completion onscreen, the storyline including a plurality of acts and depicting a liquid or an object attempting to travel from a predetermined source toward a predetermined destination through an onscreen conduit that includes a plurality of conduit segments laid out on a game play grid; providing a plurality of betting opportunities within each of the acts; providing user interaction means to enable a player to selectively alter attributes of at least one of the plurality of conduit segments, to select at least one of the plurality of betting opportunities and to complete a bet; providing a random-number generator, and controlling an unfolding of the onscreen storyline and determining an outcome of the bet responsive to random numbers generated by the random number generator subsequent to the player activating a bet command.

The attributes may include a position of a conduit segment and/or an orientation of a conduit segment, for example. A step may be carried out of laying out at least the predetermined source and the predetermined destination on one or more of the displays prior to enabling the player to place the bet. The method may also include enabling the player to bet on whether a conduit spanning from the predetermined source to the predetermined destination will be successfully completed. The method may also include a step of enabling the player to bet on whether randomly drawing a new conduit segment from a menu of available conduit segments will successfully replace a missing, faulty, or incorrectly aligned conduit segment. A step of enabling the player to bet on whether a selected one of a plurality of natural or man made calamities will damage the onscreen conduit may also be carried out, according to an embodiment of the present invention. The natural or man made calamities may include, for example, a tornado, an earthquake, an explosion, lighting and/or a tsunami. The game play grid may include a plurality of game play grid segments and the method further may include a step of enabling the player to place side wagers on one or more designated game play grid segments such that when a random layout of the conduit segments on the game play grid causes a conduit segment to pass through one or more of the designated game play grid segments, the player's side wager may be considered a win and the player may be given a reward based on a published pay table. The method may also include an animation step that displays changes to conduit segments that have been altered responsive to bets by the player and the random number generator in a visually entertaining fashion. The player may also be enabled to, for example, rotate misaligned conduit segments. The computer-implemented method may further include inviting an other player of an other gaming machine to participate in the storyline over a gaming network, the other gaming machine including a primary and a non-primary display, whereupon the other player participates in the storyline on the non-primary display while continuing to participate in an independent storyline of their own on the primary screen.

Still another embodiment of the present invention is a computer-controlled game. Such a game may include a computer; at least one display displaying liquid or an object attempting to travel from a predetermined source toward a predetermined destination through a conduit shown laid out on a game play grid, the conduit including a plurality of conduit segments; an interface configured to enable a player to selectively place bets on whether the conduit will be formed to fully connect the predetermined source to the predetermined destination, and configured to enable the user to selectively alter attributes of at least one of the plurality of conduit segments, and a random number generator coupled to the computer for determining a final layout of the conduit on the game play grid subsequent to the player activating a bet command. The interface may be further configured to enable the player to alter attributes of at least selected conduit segment within a predetermined time period. The attributes may include, for example, a position of a conduit segment and an orientation of a conduit segment. The predetermined time period may be determined by, for example, the time it takes the object or liquid to travel from the predetermined source to the predetermined destination.

Another embodiment of the present invention is a computer-controlled game that includes a computer; a display; an interface coupled to the computer and configured to enable a player to selectively place bets on whether a conduit to be shown on the display will enable a liquid or an object to travel from a predetermined source to a predetermined destination through the conduit; a random outcome generator configured to randomly determine a layout of the conduit and displaying the determined layout of the conduit on the display, and to randomly determine an outcome subsequent to the player activating a bet command.

BRIEF DESCRIPTION OF THE DRAWINGS

FIG. 2 is a representative graph showing the manner in which the player's tension may mount over the course of a multi-act electronic game, according to the present invention.

FIG. 3 shows three illustrative examples of the thematic structure of three multi-act electronic games, according to further embodiments of the present invention.

FIG. 6 shows two further embodiments of the present invention, in which the sections are pipes or roadway sections.

FIG. 10 shows an example of a "New Part" betting opportunity, according to an embodiment of the present invention.

FIG. 11 illustrates further aspects of an electronic game according to an embodiment of the present invention.

FIG. 16B shows additional examples of Game Play Grids, according to further embodiments of the present invention.

DETAILED DESCRIPTION

Embodiments of the present invention include methods for providing casinos with a multi-act class of electronic games that is based on simple storyboards that are readily accessible to the younger generation of players. This new class of electronic games may be configured to leverage recent home video games and popular culture and may tie in familiar games such as, for example, "SimCity®" and "The Sims®" or utilize familiar TV characters such as the cast of "Friends" or familiar film themes such as the "Lord of the Rings" or "Star Wars®". Multi-act storyboarded electronic casino video games that combine captivating animations, rich selection criteria, rising tension, conflicts, "Mystery Snags" and multi-line play with dynamic decision-making opportunities and never before offered betting options will produce an entirely new and unrivaled gaming experience.

Figure 1:
FIG. 1 is a block diagram of a storyboard of a three-act game for a gaming machine, according to an embodiment of the present invention
Figure 1:

As shown in FIG. 1, a three-act scenario or storyboard that may be implemented in an electronic multi-act electronic game according to an embodiment of the present invention may include a first act to establish the premise of the multi act electronic game, a second act to test the established premise (by introducing a difficulty, conflict or snag, for example) and a third act that may result in a complete or partial resolution of the difficulty, conflict or snag introduced in the second act. Variations may occur to those of skill in this art, FIG. 1 being presented for exemplary and non-limiting purposes only. The multi-act electronic game according to embodiments of the present invention may seek to engage the player, such that the player develops a vested interest in the premise, in the snags or difficulties that occur and the resolution thereof. Indeed, the present multi-act electronic games may seek to increase or otherwise manipulate the player's tension, alertness or emotions during the course of a game. As shown in FIG. 2, each act of electronics games according to embodiments of the present invention may build on the preceding act, and the player's tension may build or ebb according to the flow of the story presented. As shown in FIG. 2, the tension may build slowly over time at the beginning of the game, and grow non-linearly as the game unfolds and snags are encountered. The tension may be at least partially released toward the end of the game.

FIG. 3 shows three illustrative examples of the thematic structure of three multi-act electronic games, according to further embodiments of the present invention. Each act within a multi-act game is preferably associated with an act sequence number. As shown, an electronic game 302 may be structured as a three-act game, including a first construction act 304, a second act 306 in which the constructed item (e.g., road, vehicle, bridge) is tested and subjected to snags (e.g., extreme weather, earthquakes, attacks), and a third act in which the testing and snags are resolved, as shown at 308. Similarly, the storyboard of another electronic game 310 may call for the creation of an itinerary of a journey as shown at 312, a second act in which the player, the player's avatar or other character travels the established itinerary and encounters difficulties or snags along the way as shown at 314, and resolution (e.g., reaching or failing to reach the destination, reaching or failing to reach the object of the quest), as shown at 316. Those of skill in this art may recognize that many other multi-act themes may be implemented. Such themes may be taken from myths, literature, popular culture, scientific journeys of discovery, to name but a few possibilities. For example, the storyboard of a third electronic game 318 according to an embodiment of the present invention may call for the establishment of a relationship (between the player and a character, between two or more characters, between players on different gaming machines playing the same game, etc.) as shown at 320, a testing of the established relationship (e.g., a player or character gets injured, falls in love and/or betrays the player or another character) as shown at 322, and the resolution of the conflict or test, as shown at 324.

Embodiments of the present method may also be structured around two acts or around more than three acts. For example, an electronic game according to an embodiment of the present invention may be configured or "staged" as a two-act scenario, including (a) selecting "acting" players (actual or computer generated) for a Poker game and (b) playing the Poker game. Betting opportunities may include (without limitation) which players will be chosen, the character and gaming style of each player, which player will win, which player will be the first to lose, how long will the game last and how much will the winner gross, to name but a few possibilities. A typical four-act scenario for a game may be: (a) Establish the premise; (b) Unfold the premise, (c) Complicate the premise, and (d) Resolution of the premise. Alternatively, "acting objects" may be selected for staging an act wherein the objects may be configured and used in the performance of the act; a car and a bicycle may be examples of acting objects.

It is to be noted that embodiments of the present invention are not limited to two, three or four-act electronic games. Potentially, games having a greater number of acts may be implemented. For example, the electronic game may have 10, 20, 200 or an unlimited open-ended number of acts, each of which may be associated with an act sequence number. Indeed, the game play may be configured so as to enable players to evolve the game and influence the manner in which it unfolds, thereby keeping the game play new and fresh. Contextual game information may be periodically saved, so as to enable the player to interrupt game play and to resume game play and the same story line at some latter time. Such contextual information may be saved on a central server, one or multiple gaming machines coupled in a peer-to-peer network, stored on a player loyalty card or any combination of these. If the storyboard is sufficiently complex and the game play sufficiently engaging, it is believed that players may become attached to the characters and develop a vested interest in the eventual outcome of the story presented.

Figure 4:
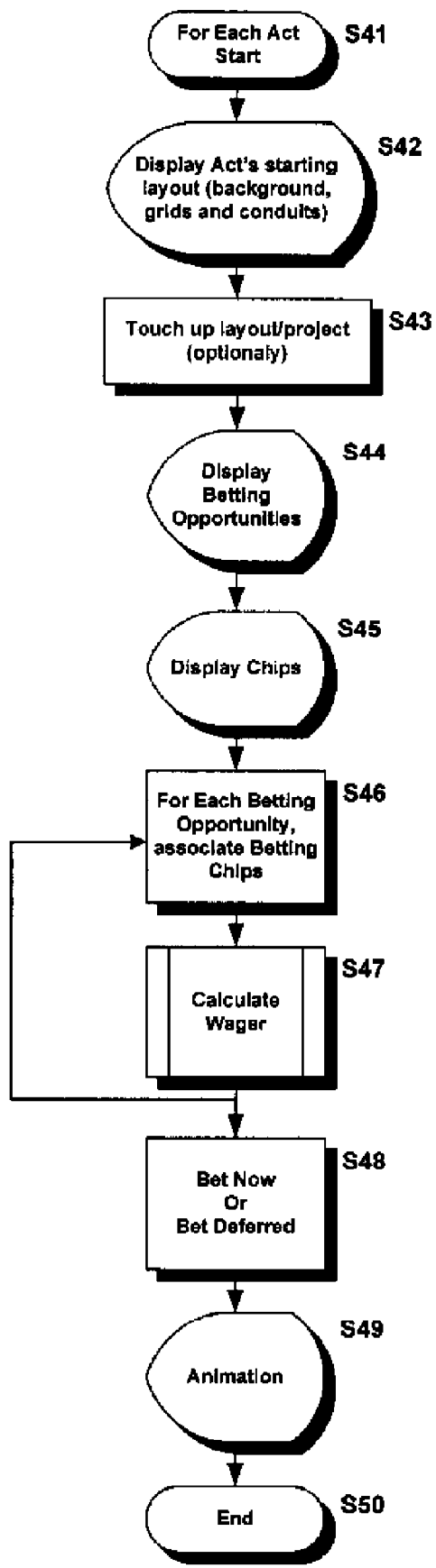
FIG. 4 is a flowchart of a baseline flow within one act of a multi-act electronic game, according to an embodiment of the present invention.

FIG. 4 is a flowchart of a baseline flow of steps that may be carried out within a single act of a multi-act electronic game, according to an embodiment of the present invention. For each act, as shown at S41, the current act's starting layout or stage may be displayed. As called for by S42, the starting layout may include background graphics, grids (such as a Game Play Grid described hereunder), conduits, scenery or whatever environment is consistent with the storyboarded script for the current act. The starting layout of step S42 may be the layout of the previous act. In cases wherein game play occurs on or within a grid, the grid may be two dimensional, three dimensional, regular, irregular and/or composed of insular regions, for example. As called for by step S43, the player may then optionally be given an opportunity to alter layout according to his or her preferences, using onscreen commands. In step S43 and/or step S44, one or more Palettes of Betting Opportunities may be displayed, each of which may offer a category of features on which the player may place bets. The features may be selected in accordance with the current staging context of the act, that is, are relevant to the story, actors and staging of the act being displayed. Such categories of features may include, for example, persons, characters, events, construction parts, sources and destinations, to name but a few possibilities. As used herein, the phrase "Palette of Betting Opportunities" (or wagering opportunities) refers to a range of available categories or items on which the player may place one or more bets. In step S44, Betting Opportunities Icons may be displayed to the user. Each of the Betting Opportunities Icon, when selected, may cause a corresponding Palette of Betting Opportunities to be displayed for the user. Each Betting Opportunity Icon, therefore, may be associated with a Palette of Betting Opportunities. Such Palette of Betting Opportunities may be displayed, for example, within a pop-up window or within a roll-out pane—or by other means through a suitable user interface. As called for by step S45, a graphical representation of the available bets may be displayed, depending upon the Betting Opportunities Icon selected by the player. The available bets may be graphically represented as one or more Chip Palette Icons. When the player selects one of the Chip Palette Icons, a Palette of Chips may be displayed. A Palette of Chips, according to an embodiment of the present invention, may include a graphical representation of available bets which, when selected, allow the player to interactively place one or a plurality of selected chips onto a betting opportunity. The Palette of Chips may also be displayed via, for example, a pop-up window or a roll-out pane, for example.

Therefore, one or more Betting Opportunities Icons may be displayed on the layout for each act and in accordance with the current staging context, and each of the Betting Opportunities Icons may, when selected by the player, cause the display of a selected Palette of Betting Opportunities. When the player selects one of the betting opportunities from the Palette of Betting Opportunities, one or more Chip Palette Icons may be displayed. When the user selects one of the Chip Palette Icons, a Palette of Chips may be displayed, enabling the user to place one or more of the displayed chips onto a selected betting opportunity. Alternatively, the Betting Opportunities Icons and the Chip Palette Icons may be dispensed with, and the Palette of Betting Opportunities and the Palette of Chips displayed directly, without first displaying the Betting Opportunities Icons or Chip Palette Icons.

Betting chips representing the player's selected bet may then be associated with any betting opportunity selected by the user, as shown at S46. Thereafter, the wager (or stake) may be calculated based upon the chips associated with the betting opportunity and a predetermined formula and/or pay table, as suggested at S47. The method may revert to step S46, should the player wish to place additional bets on any other betting opportunities available within the displayed Palette of Betting Opportunities.

As shown at S48, players may have the option to watch his or her bets unfold one-by-one within each act, or may defer finding out whether the bets are winners or losers in order to watch the entire storyboard unfold before their eyes, with each placed bet resolving as the underlying story unfolds. That is, a player may be given the opportunity to place all bets in each act before any of the acts unfold and watch the results thereof like a movie, or to interactively place bets within individual acts and have the results of such bets revealed in a piecewise fashion, within each act. As the bets and the storyboard unfolds, rich animation, movie sequences, sounds and graphics may be rendered on the gaming machine's video display(s), with appropriate sound and video effects at strategic times during the action and as bets are won and lost. For example, as developed fully herein below, the premise of a storyboarded three act game may be to construct a pipe to enable a liquid to flow between a source and a destination. The animation of step S49, in that case, may include showing the liquid as it flows from the source to the destination. Some pipe sections may be shown to be initially spinning (thereby building tension and anticipation), and then shown to progressively slow down as the liquid approaches the spinning section. If the pipe section is the correct section and if the pipe section is oriented correctly, the spinning may stop to allow the liquid to flow therethrough (thereby releasing player tension). If the spinning pipe section was the subject of a betting opportunity and if the player placed a bet that the spinning pipe section was indeed the correct pipe section and was oriented correctly, the player may be rewarded with a payout, according to the pay table for this betting opportunity and the amount wagered. To add complexity, the pipe section may indeed be the correct one and be correctly oriented, yet turn out to be rusted out and leaking. This would, in turn, lower any payout, again according to the predetermined pay table for that betting opportunity and the amount wagered. The quality of the pipe section may be a factor in the associated displayed representation of an outcome amount (i.e. lower quality parts equate to a lower outcome amount). Examples of quality factors are a leaky part, a corroded part, an undersize part, a partly obstructed part, an inferior quality part, a non genuine part, a faulty part and a damaged part.

Figure 5:
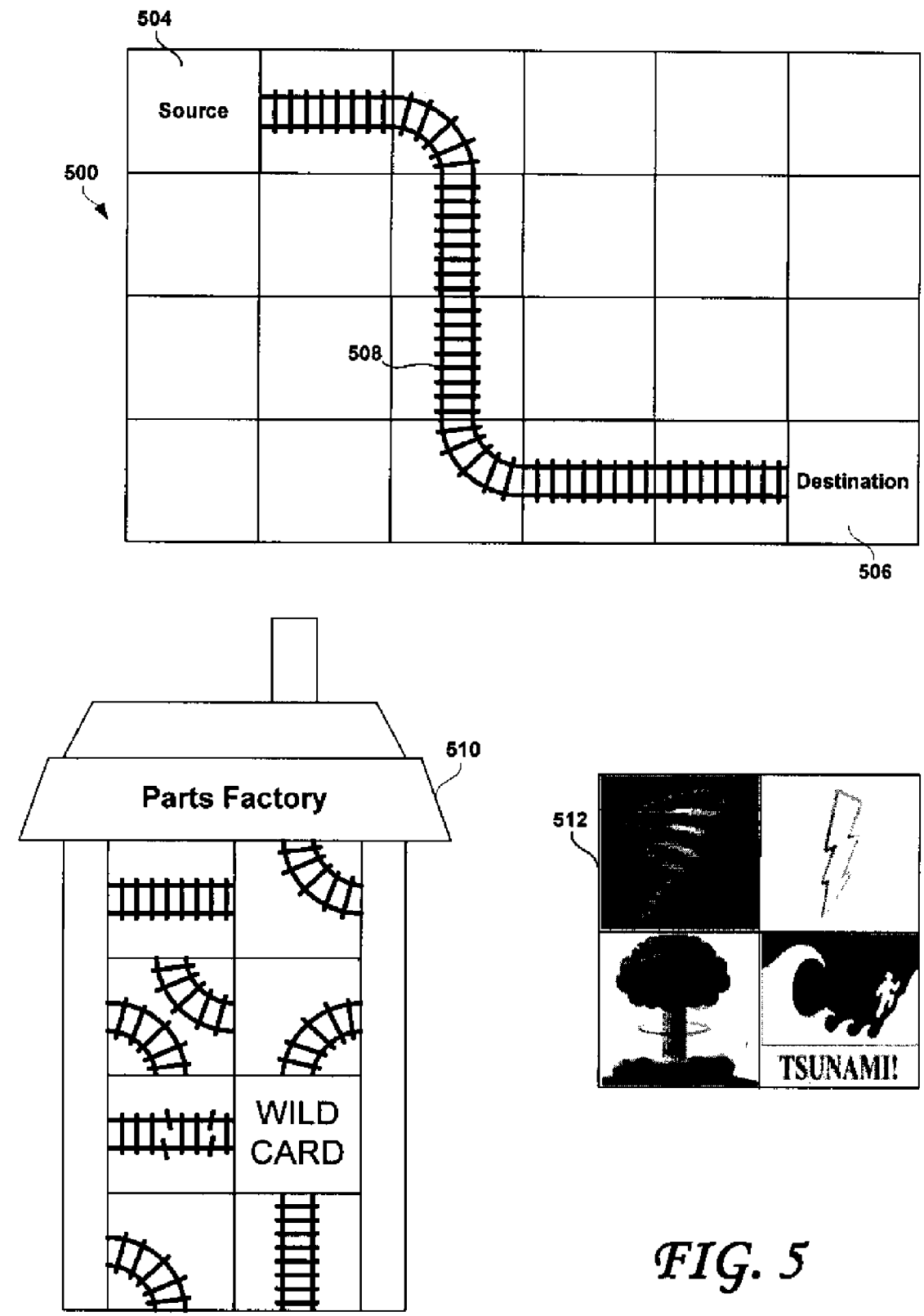
FIG. 5 shows an exemplary layout of an electronic multi-act game, according to an embodiment of the present invention.

FIG. 5 shows an exemplary layout 500 of an electronic multi-act game, according to an embodiment of the present invention. The layout 500 may also be referred to as a stage on which one or more of the acts of the present electronic multi-act game may unfold according to a storyline. Different acts may unfold on different stages or layouts 500. The layout 500 may include a plurality of grid sections that collectively may be referred to as a Game Play Grid. The grid sections need not be rectangular, need not be regular and need not be contiguous. According to an embodiment of the present invention, bets may be placed on selected constituent grid sections of the Game Play grid. In the example to be developed below, the storyboard includes one or more acts related to getting from a starting point 504 or source, to a destination 506. In the illustrative example of FIG. 5, a railroad is shown across the grid sections of the Game Play Grid 500. A Palette of Betting Opportunities 510 may also be provided, which Palette of Betting Opportunities may include graphical representations, in this example, of a number of railroad sections and optionally, one or more "Wild Card" sections. This Palette of Betting Opportunities 510 (called the "Parts Factory" in FIG. 5) may include a range of railroad sections (in this example). As shown in FIG. 5, one of the goals of this embodiment of the present electronic game may be to connect a source 504 to a destination 506, using the railroad sections shown in the Palette of Betting Opportunities. The player may build up a predicted railroad path from the source 504 to the destination 506 by moving selected railroad sections, section by section, from the Palette of Betting Opportunities 510 to the Game play Grid 500. The player may select a bet from a Palette of Chips for each or selected railroad sections moved from the Palette of Betting Opportunities to the Game Play Grid 500, representing the player's wager that the actual railroad section to be generated by the electronic game will match the predicted railroad section moved by the player from the Palette of Betting Opportunities 510 to the Game Play Gird 500. When the player has finished placing his or her bet(s), the player may press a "Bet" button (for example), whereupon the electronic game may generate the actual patch of the railroad from the source 504 to the destination 506. Each time a predicted railroad section matches the actual railroad section generated by the electronic game, the player may be rewarded according to his or her bet placed on that section and a predetermined pay table. Alternatively, the player may be rewarded only if the actual railroad matches the predicted railroad in its entirety. The Palette of Betting Opportunities may include acting objects that may be selected for inclusion into an act being prepared (or staged). Acting objects may be removed or their attributes may be modified. Examples of attributes for a "person" acting object include, for example, hair color, eye color and the character. Examples of attributes for a "car" acting object include, for example, the model of the car and the color of the paint.

Embodiments of the present invention may include more than one Palette of Betting Opportunities, as shown at 512. This Palette of Betting Opportunities may be called "Mystery Snags." "Mystery Snags", according to embodiments of the present invention, may include an event that may damage, destroy or weaken a previously constructed and tested project. For example, during a liquid flow animation, a blizzard snag with very low temperatures may be seen approaching the pipes, thus building tension and mystery as to whether the pipes will freeze and burst. Betting on clogged or busted pipes may be enabled through an offering of a further Palette of Betting Opportunities.

The player may select one or more of the Mystery snags 512 and place them on the Game Play Grid 500 and select a bet thereon from a Palette of Chips. For example, the player may place a bet (e.g., $1, $5 or $10) that one of the Mystery Snags will appear on the fourth railroad section 508. As shown in FIGS. 5 and 13, the Palette of Betting Opportunities 512 may include, for example, a number of natural or man made calamities such as tornadoes, lightning, a bomb or a tsunami. These Mystery Snags are only shown for exemplary purposes, as their nature is only limited by the imagination of the game developer. A third act may allow a player to bet on whether the railroad section survived the Mystery Snag, for example.

FIG. 6 shows two further embodiments of the present invention, in which the sections are not railroad sections as in FIG. 5, but pipes (602) or roadway sections (604). One of the goals of these embodiments may include successfully carrying a liquid within the built up pipe from the source to the destination as shown at 602 or enabling a vehicle to successfully follow the built up road from the source to the destination, as shown at 604. More than one path may be present on the Game Play Grid, as shown in Game Play Grid 604, in which the player may build up two paths; one from source A to destination A and another from source B to destination B. Such construction-based projects may take many forms, including but not limited to: roads, wiring, pipes, labyrinths, train tracks, rivers, fuel lines, ignition cords and corridors. In other types of storyboards, projects may take on more abstract embodiments such as quests or emotional journeys. The Mystery Snags may vary according to the form of the project. For example, one of the Mystery Snags for a wiring project may include a rat gnawing through a wire section or, for a river, beavers damming up a section, preventing the water to flow therethrough.

As shown in the Game Play Grid 604 and according to a further embodiment of the present invention, the present electronic game may also generate an incomplete path from the source(s) to the destination(s) in a first act and the user may then place bets on which section will next be generated to complete the roadway (in this example) from the source to the destination during a second act. For example, the player may bet that grid square 608 will change to a section that completes the roadway. Alternatively, the player may place a bet on grid square 606, betting that the straight roadway section currently appearing therein will change to a curved roadway section and join up with the roadway section appearing in grid square 610.

Figure 7:
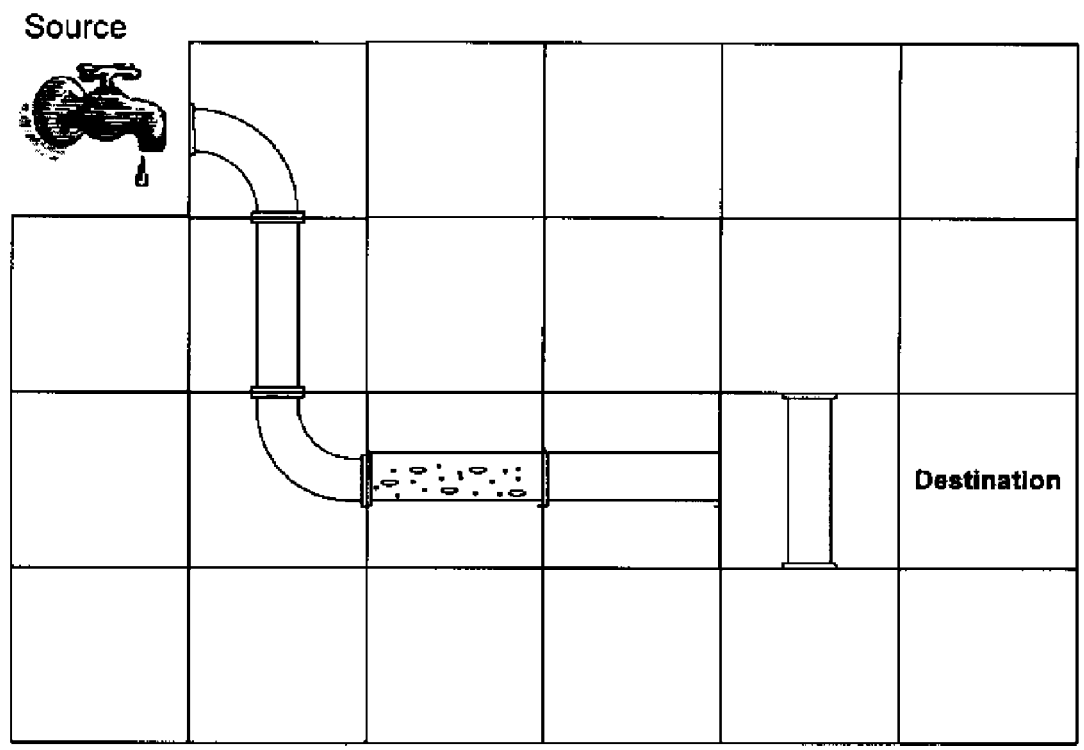
FIG. 7 shows further aspects of another embodiment of the present invention.
Figure 7:
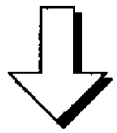
Figure 7:
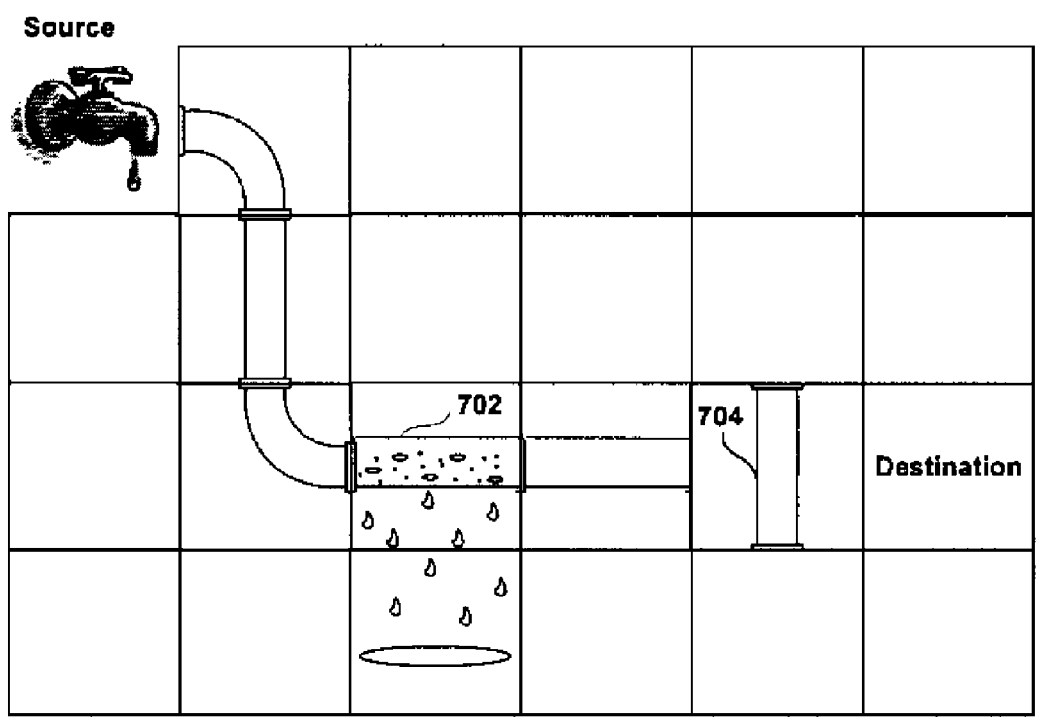

FIG. 7 shows further aspects of another embodiment of the present invention. As shown therein, after a construction first act in which the pipeline is constructed, the player may experience a second act, in which the constructed pipeline may be tested. For example, as shown in FIG. 7, water may be caused to flow through the constructed pipe. Some of the game's source to destination combinations may include (but are not limited to), for example, syrup to a lumberjack's pancakes (red-brown liquid), squid ink to a pen factory (purple liquid), a beer keg to a thirsty Viking's mouth (golden liquid), gasoline to a race car's fuel tank (golden liquid), fountain of youth water to an aging explorer's mouth (crystal blue liquid), intergalactic medicine to an alien hospital (glowing green liquid), etc. Players may be awarded greater rewards for completing pipelines that carry more rare/valuable/flammable liquids. The game's pipe sections may include (but are not limited to), for example, I-shapes, horizontal I's, crosses, loops, and elbow-macaroni shapes in multiple orientations. As shown in the lower drawing of FIG. 7, when the water (or other source material) flows through a faulty pipe section as shown at 702, leakage (inefficient transportation) of the liquid may occur. Players may be awarded smaller rewards for such inefficient transport. As shown at 704, when the water or other source material reaches a missing or incorrectly aligned section, it will not pass through to its destination, and the player may not be rewarded.

Figure 8:
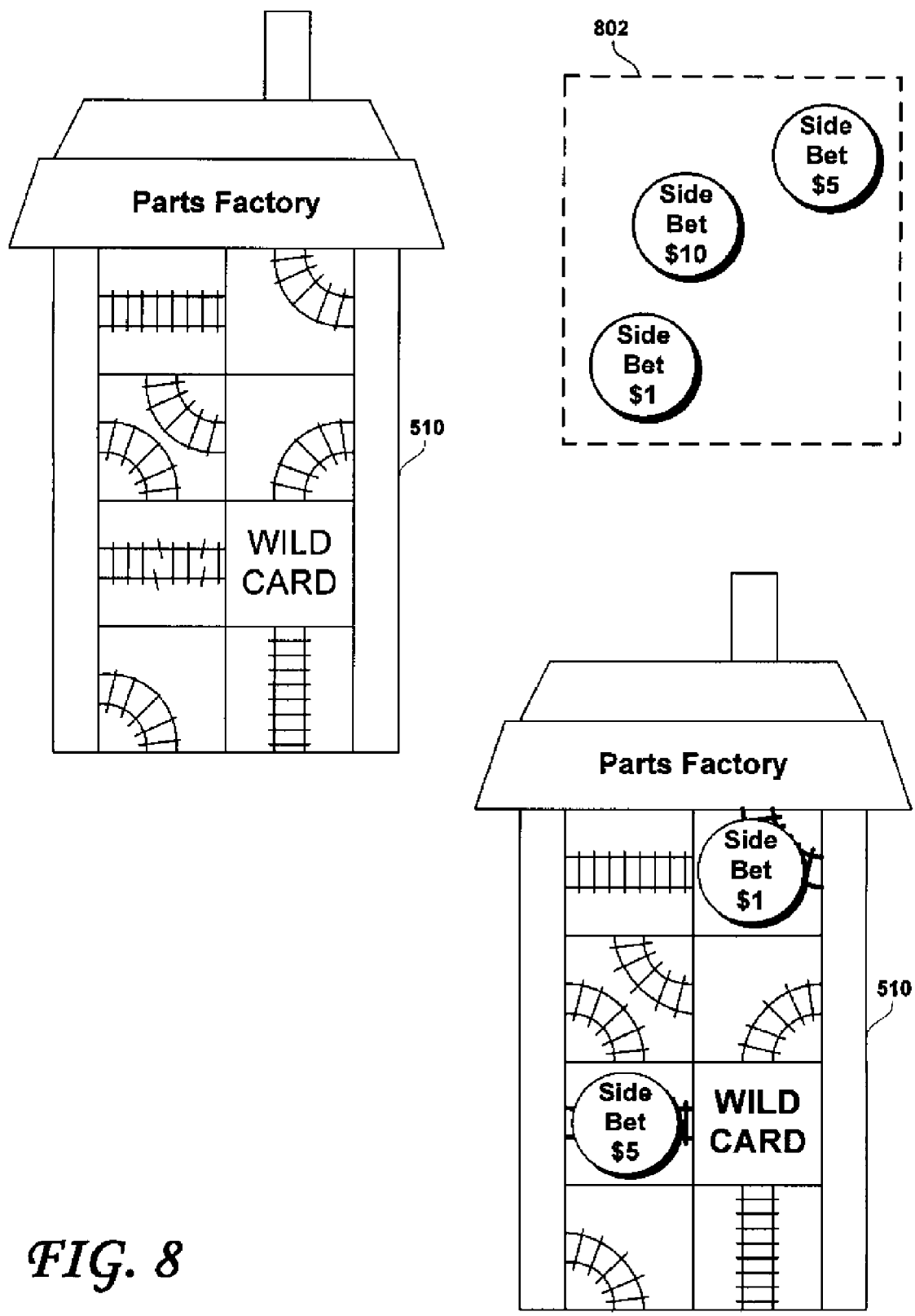
FIG. 8 FIG. 8 shows further aspects of an electronic game according to embodiment of the present invention.

FIG. 8 shows further aspects of an embodiment of the present invention. As shown, the player may place bets on which of the sections in the Palette of Betting Opportunities 510 will appear next in the Game Play Grid. To do so, the player may select one or more chips from a Palette of Chips 802 and place the selected chip or chips onto selected one or ones of the sections of the Palette of Betting Opportunities 510.

Figure 9:
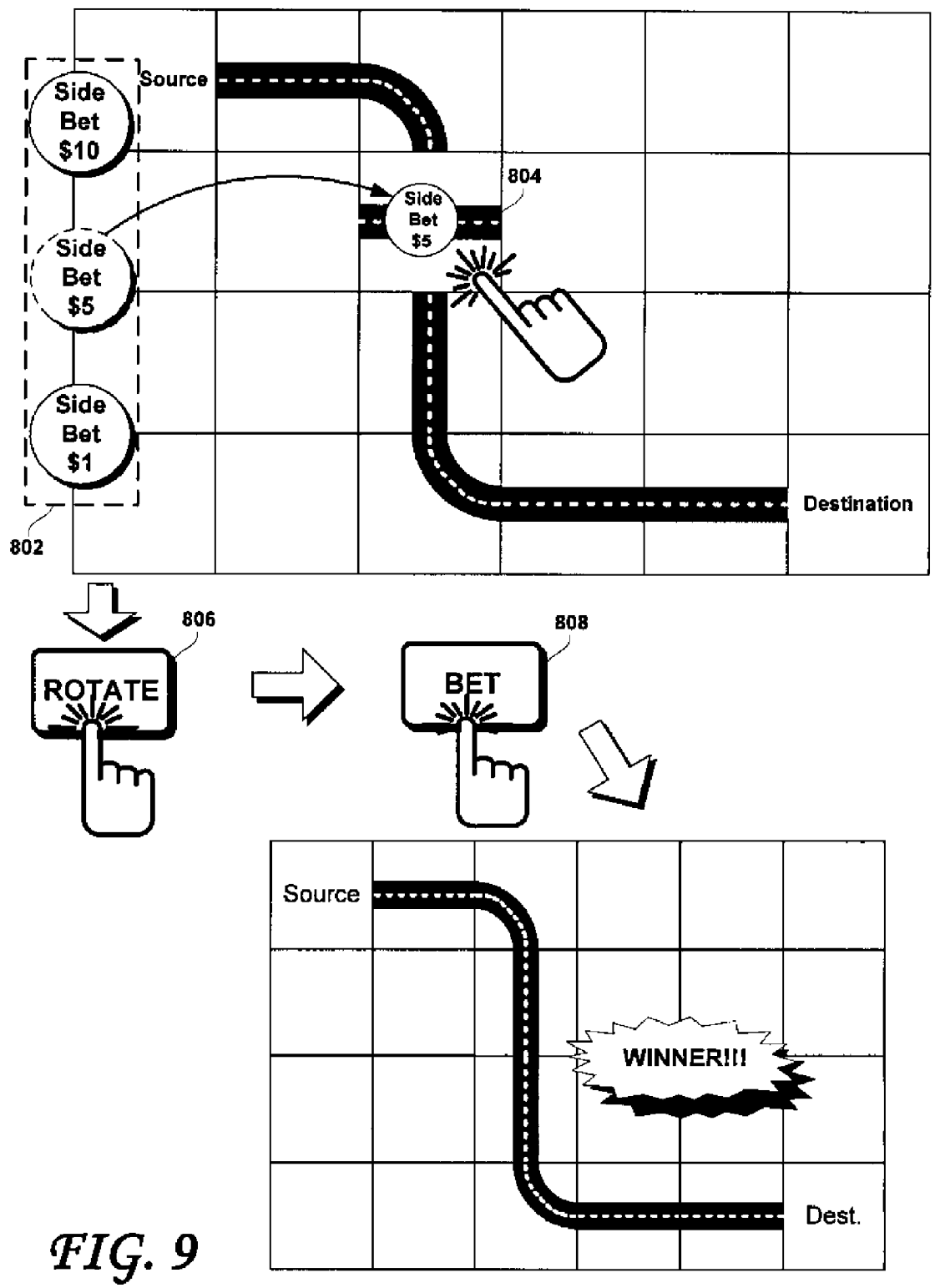
FIG. 9 shows still further aspects of an electronic game according to embodiment according to the present invention.

FIG. 9 shows further aspects of an embodiment according to the present invention. As shown, when a section of the generated roadway is misaligned, the player may be invited to place a bet on whether the next iteration and regeneration of the roadway will rotate the misaligned section 804. To do so, the player may press a Rotate button 806, which represents the Palette of Betting Opportunities for this section. In this case, the Palette of Betting Opportunities 806 only contains a single betting opportunity—namely, to rotate the section of roadway. After having selected the rotate betting opportunity, a Palette of Chips 802 for this betting opportunity may appear, enabling the player to bet, in this case, $1, $5 or $10 that section 804 will be rotated when the roadway is next regenerated by the electronic game. In FIG. 9, the player has selected a $5 bet, which may then be placed (e.g., dragged and dropped) onto the misaligned section 804, as shown. After the player has placed his or her bet, the Bet button 808 (or functional equivalent) may be pressed. If the next iteration and regeneration of the roadway rotates misaligned section 804, the roadway is complete and the player wins, and may be rewarded according to the predetermined pay table and his or her $5 bet. Various animations, graphics and/or sound effects may further add to the reward and heighten the gaming experience. For example, the misaligned roadway on which the bet was placed may be caused to blink until the roadway is regenerated.

FIG. 10 shows an example of a "New Part" betting opportunity, according to an embodiment of the present invention. As shown, when a section of the generated railway is misaligned as shown at 1002, the player may be invited to bet whether a new part will be the correct section of railway to complete the railway from the source to the destination. To do so, the player may press a New Part button 1004 (or some functional equivalent in the user interface), which may form part of the Palette of Betting Opportunities for this section. Note that the Rotate betting Opportunity as shown in FIG. 9 may also have been selected by the player. In that case, the Palette of Betting Opportunities may contain two betting opportunities; namely, the Rotate betting opportunity and the New Part betting opportunity. After having selected the New Part betting opportunity, a Palette of Chips 802 (see FIG. 9) for this betting opportunity may appear, enabling the player to bet that section 1004 will be replaced with a new part that will complete the railway—in this case, a straight section of track. After the player has placed his or her bet, the Bet button 808 (or functional equivalent) may be pressed. The electronic game may then trigger an animation sequence during which a random Number Generator (RNG) may be used to randomly select a new part from among the Palette of Betting Opportunities 510 and to place the selected new part 1004 into the Game play Grid at the position previously occupied by misaligned section 1002. As shown, the selected section does not successfully complete the railway and the player may lose his or her bet.

FIG. 11 illustrates further aspects of an electronic game according to an embodiment of the present invention. As shown, players may place a single bet on a single project (e.g., construction of a railway, roadway, pipeline, etc.), as shown in the top drawing of FIG. 11 or may place multiple bets on multiple projects that may appear within the Game Play Grid, as shown in the bottom drawing of FIG. 11.

Figure 12:
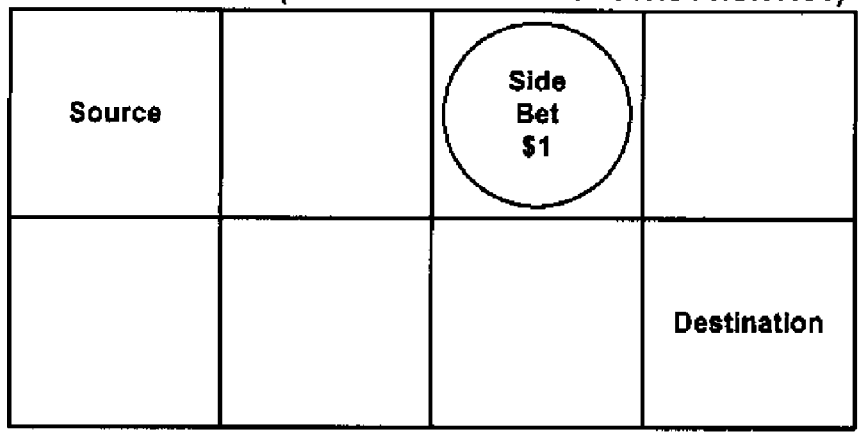
FIG. 12 illustration placing side bets, according to an embodiment of the present invention.
Figure 12:
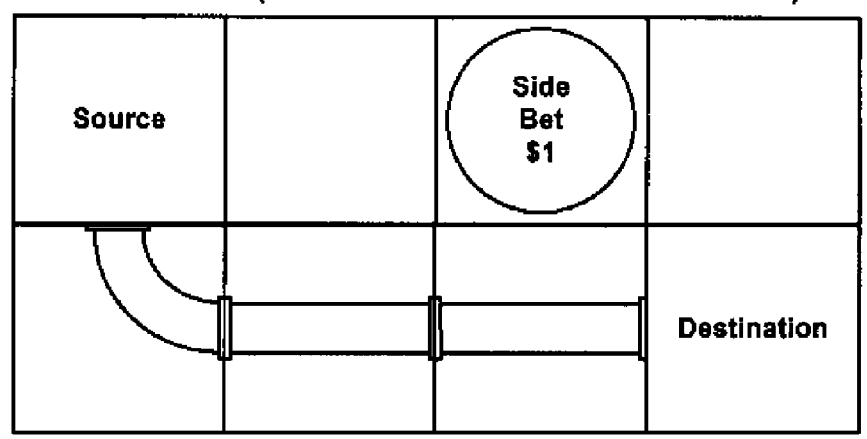
Figure 12:
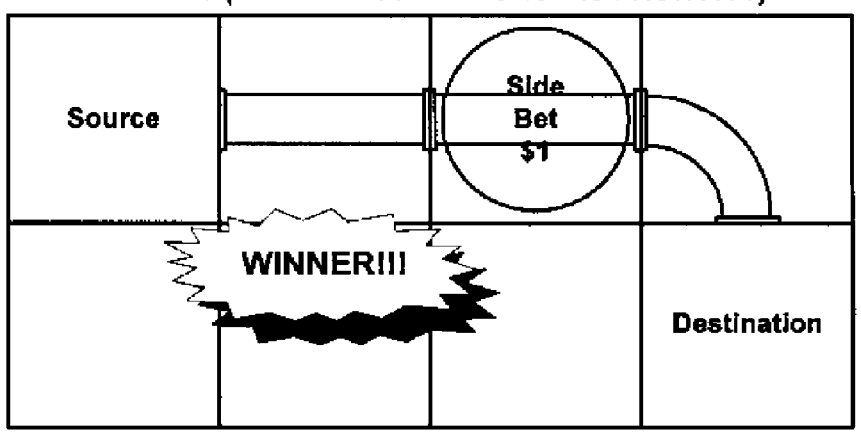

FIG. 12 illustration placing side bets, according to an embodiment of the present invention. As shown, before the first act (that is, before a project is constructed, for example), the player may place one or more side bets. In the exemplary embodiment of FIG. 12, the storyboard of this multi-act electronic game calls for the construction of a pipeline. The player, according to a further embodiment of the present invention, may place on or more side bets to predict where one or more sections of the pipeline to be constructed will be laid. In the top drawing of FIG. 12, the player has placed a $1 bet that the yet-to-be-constructed pipeline will go through the grid square where the player has placed his or her bet. The middle drawing in FIG. 12 shows an instance in which the constructed pipeline fails to pass through the grid square on which the player bet, whereas the bottom drawing of FIG. 12 shows an instance where the constructed pipeline does indeed pass through the player predicted grid square. The electronic game may then reward the winning player, according to the wager placed and a predetermined pay table.

Figure 13A:
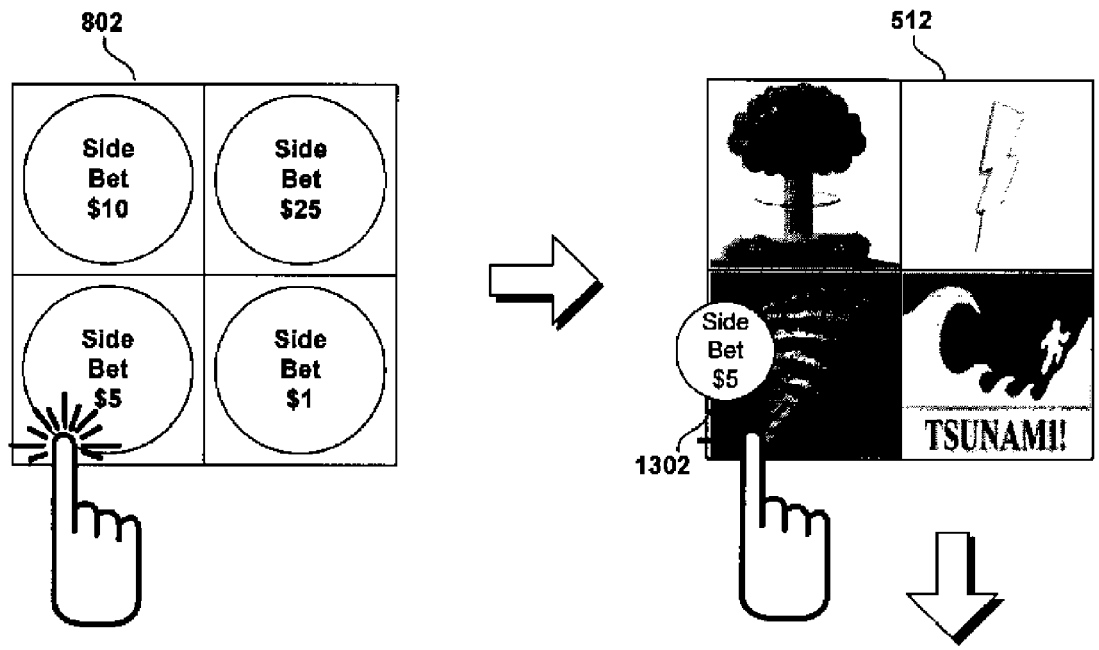
FIG. 13A illustrates the Mystery Snag Palette of Betting Opportunities, according to an embodiment of the invention.
Figure 13A:
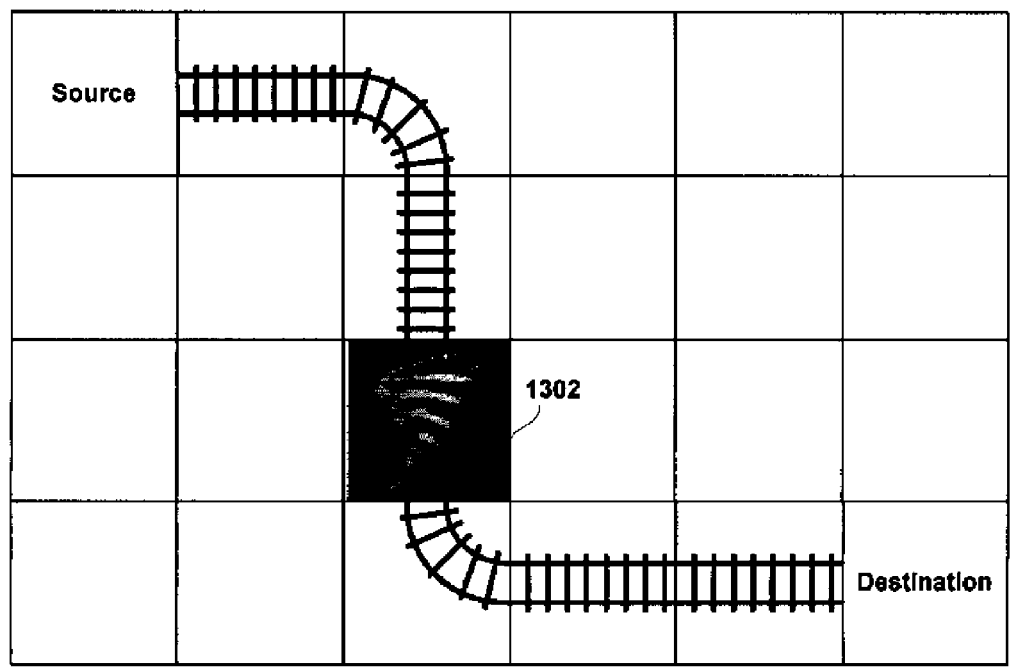
Figure 13B:
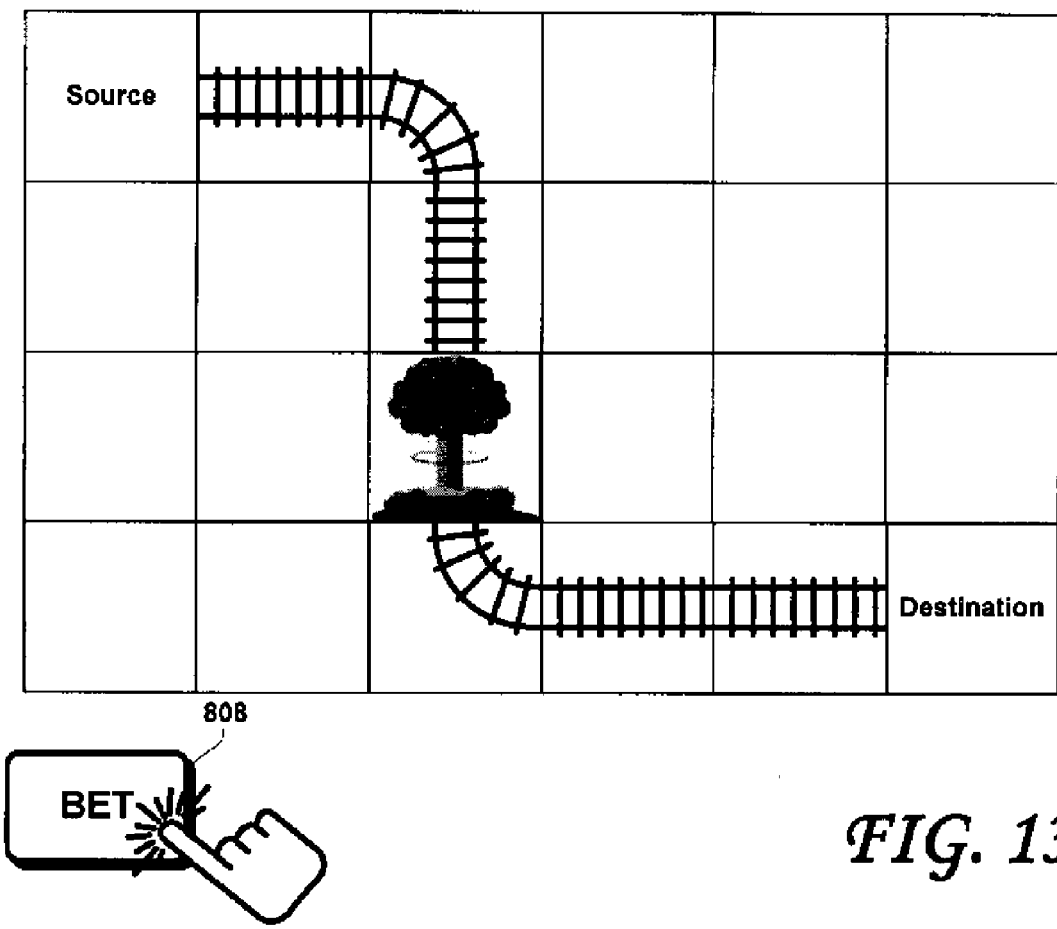
FIG. 13B shows further aspects of the Mystery Snag Palette of Betting Opportunities, according to an embodiment of the present invention.
Figure 13B:
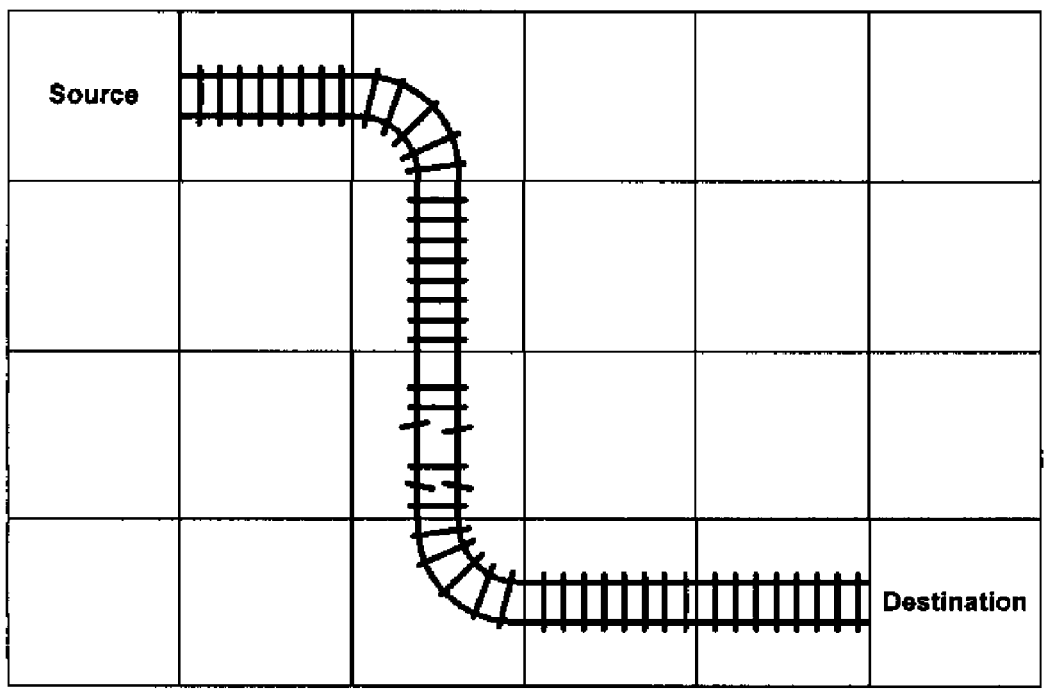

FIG. 13A illustrates aspects of the Mystery Snag Palette of Betting Opportunities, according to an embodiment of the invention. As shown, the player may be given the opportunity to place a bet (i.e., select a chip representing the desired bet from a Palette of Chips 802) on one of the Mystery Snags Palette of Betting Opportunities shown at 512. In the example shown in FIG. 13A, the user has selected a chip representing a $5 bet and selected a tornado 1302 from the Palette of Betting Opportunities 512 and placed the tornado on one of the railway sections. If a tornado is randomly selected and randomly touches down on the player selected section of the railway in the Game Play Grid, the user may be rewarded according to the wager placed (in this case, $5) and the predetermined pay table. FIG. 13B shows further aspects of the Mystery Snag Palette of Betting Opportunities, according to an embodiment of the present invention. As shown therein, other Mystery Snags such as a bomb or a faulty section of railroad track may appear and damage the construction project when it is generated by the electronic game. Players may not be awarded for projects that are ruined by such Mystery Snags.

Figure 14:
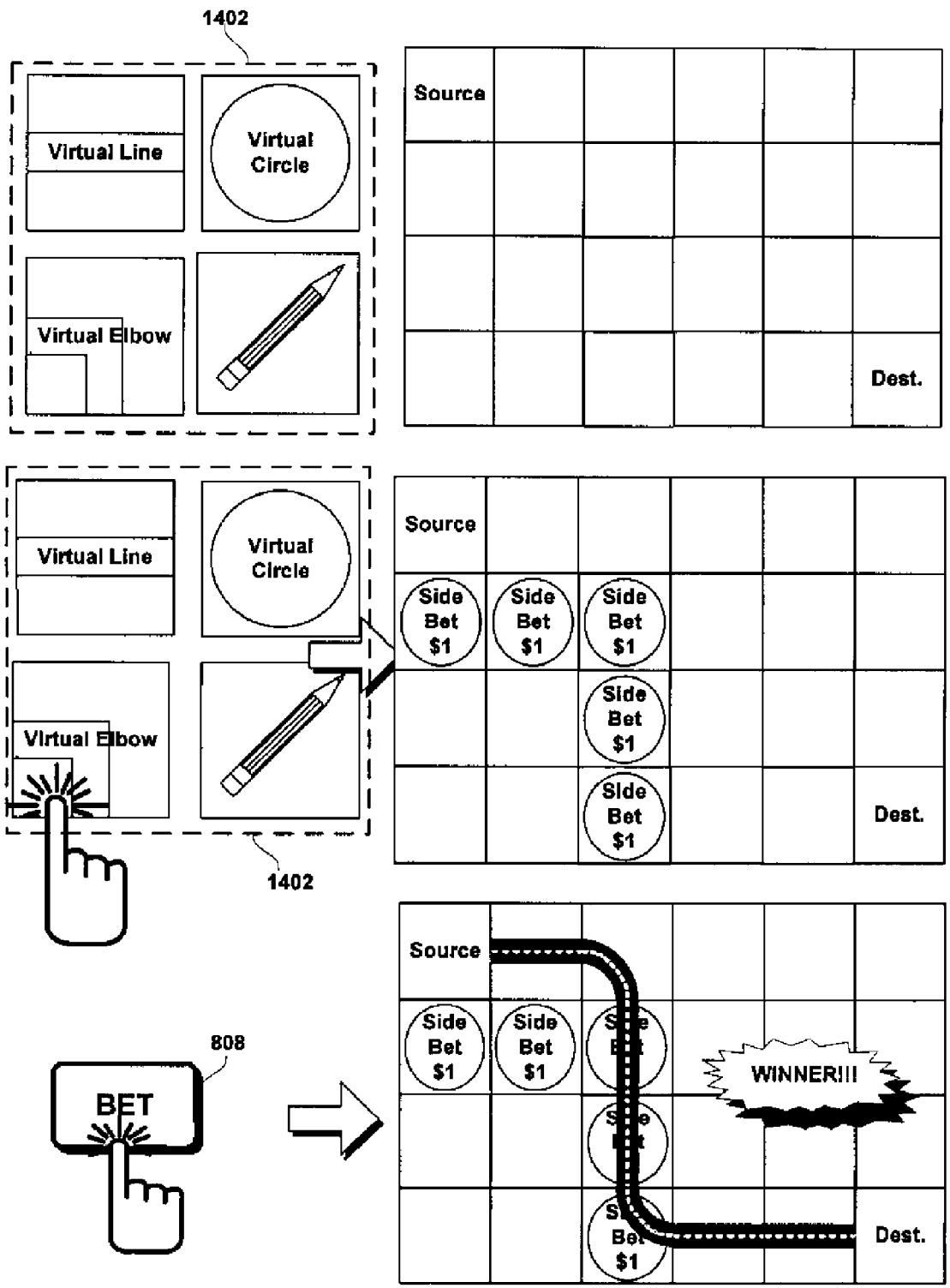
FIG. 14 shows another form of side bets, according to another embodiment of the present invention.

FIG. 14 shows another form of side bets, according to another embodiment of the present invention. Virtual Lines, according to another embodiment of the present invention, is form of side betting in which the user bets that a completed project (e.g., railway, pipeline, roadway, etc.) will pass through a variety of predicted paths, shapes and configurations on the Game Play Grid. As show, the player may be invited to place virtual lines, elbows and circles (for example) from a Virtual Lines Palette of Betting Opportunities 1402 on the Game Play Grid to build up, section by section, a predicted path of the project (in the example of FIG. 14, the construction of a roadway). Thereafter, the player may place bets (from a Palette of Chips—not shown in FIG. 14) on one or more section of the predicted path, as shown in the middle drawing of FIG. 14. Thereafter, the player may press the Bet button 808 (or execute some functionally similar action). A Random Number Generator may then be used to generate the actual roadway, as shown in the bottom drawing of FIG. 14. Where the actual electronic game generated roadway matches the predicted path of the roadway built up by the player, the player may be rewarded according to the amount of his or her wager and the predetermined pay table. In the bottom drawing of FIG. 14, the player's predicted path matched the actual path generated by the electronic game on three grid squares of the Game Play Grid. In this case, therefore, the player may be rewarded for having correctly predicted the actual path of the roadway for these three grid squares of the Game play Grid.

Figure 15:
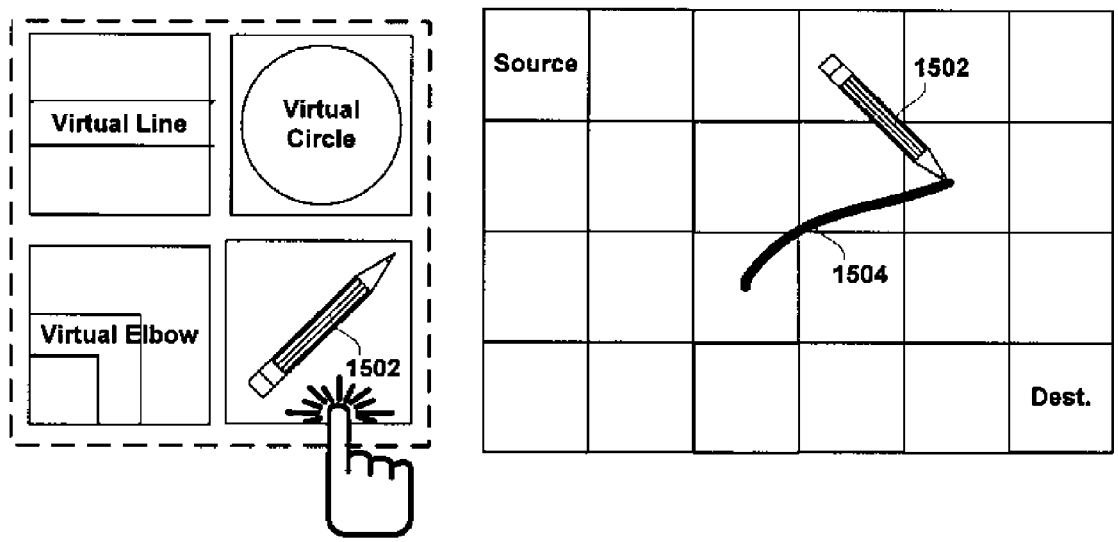
FIG. 15 shows another example of the Virtual Lines type of side bet, according to an embodiment of the present invention.
Figure 15:
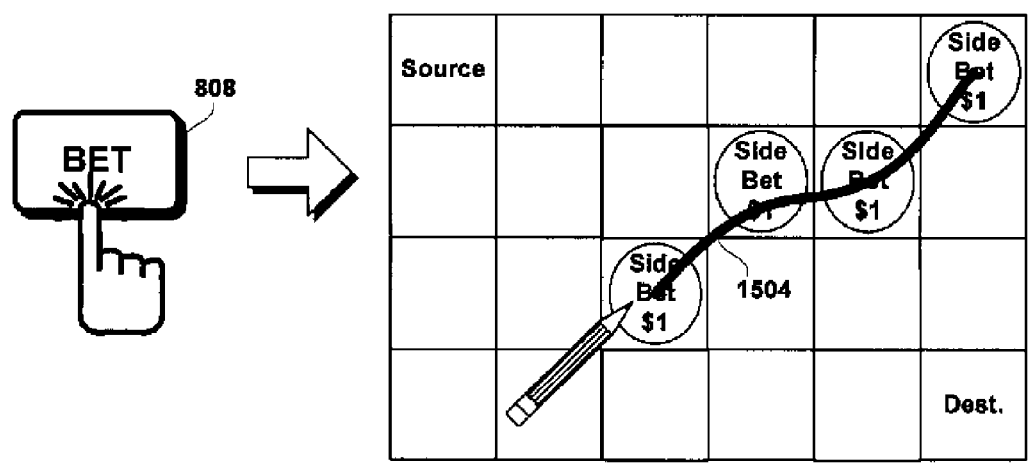

FIG. 15 shows another example of the Virtual Lines type of side bet, according to an embodiment of the present invention. The Virtual Lines Palette of Betting Opportunities may also include a Virtual Line Drawing Tool, as shown at reference 1502. Selecting the Virtual Line Drawing Tool 1502 enables the player to draw a virtual line 1504 on the Game Play Grid. The virtual line 1504 may then represent the player-predicted path of the construction (or other) project on the Game Play Grid, without the need to select individual virtual lines, elbows and circles to build up a predicted path. As shown in the right hand drawing of FIG. 15, the player may simply use the Virtual Line Drawing Tool 1502 to draw a virtual line 1504 on the Game Play Grid. Thereafter, the player may place bets on one or more of grid squares through which the virtual line 1504 passes, by selected chips corresponding to the desired wager from a Palette of Chips (not shown in FIG. 15). The end result is shown in the bottom drawing of FIG. 15, in which a plurality of $1 bets have been placed along the virtual line 1504. Should the electronic game generated project include sections that coincide with the player predicted sections, the player may be awarded according to the bet placed and the predetermined pay table.

Figure 16A:
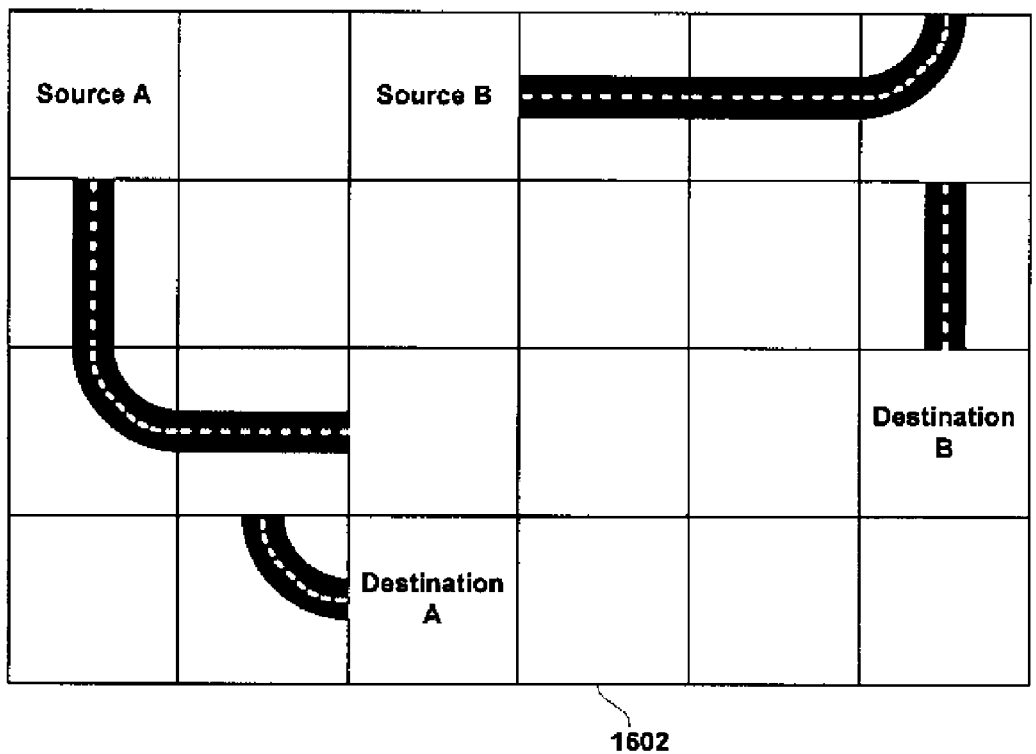
FIG. 16A shows further examples of Game Play Grids, according to further embodiments of the present invention.
Figure 16A:
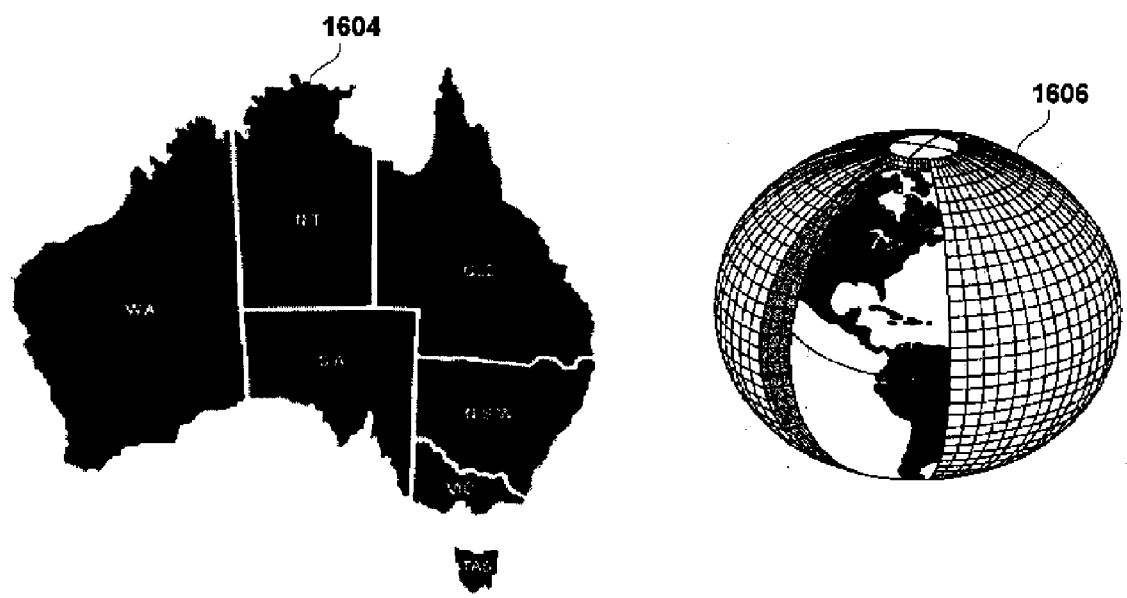
Figure 16C:
FIG. 16C shows still further examples of Game Play Grids, according to further embodiments of the present invention.
Figure 16D:
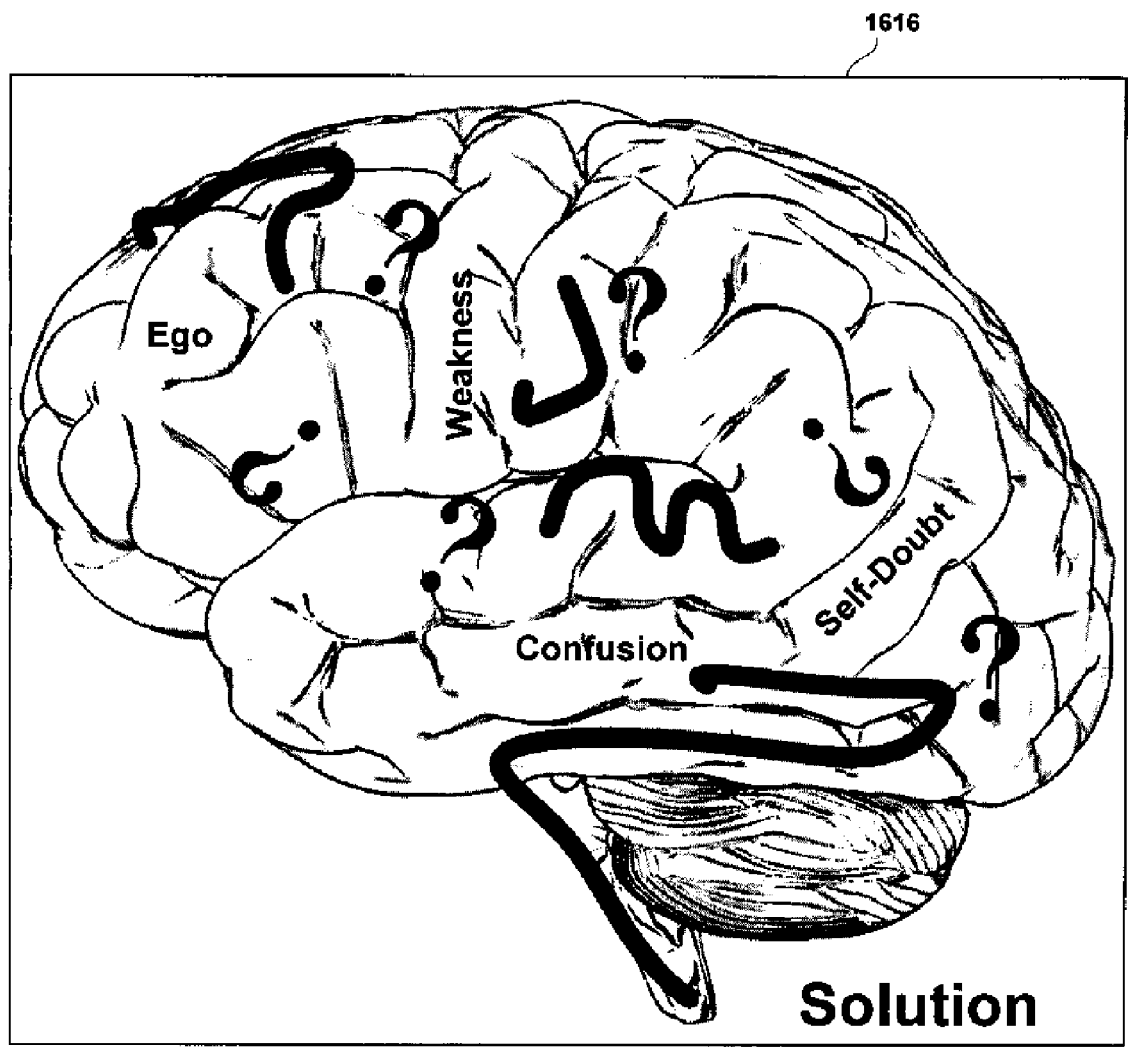
FIG. 16D shows additional examples of Game Play Grids, according to further embodiments of the present invention.

FIG. 16A shows additional examples of Game Play Grids, according to further embodiments of the present invention. As shown, a Game Play Grid may be two-dimensional and rectangular, with regularly spaced grid rectangles or squares, as shown at 1602. Alternatively, the Game Play Grid may be two-dimensional, but include irregularly-spaced and shaped grid sections, as shown at 1604. Alternatively still, the Game Play Grid may be three-dimensional and based on, for example, spherical coordinates, as shown at 1608. Game Play Grids and projects may include cultural references, such as the construction of railroad tracks across the American West for example as shown at 1610 in FIG. 16B. Alternatively still the Game Play Grid and projects may have a scientific, science fiction or fantasy bent, as is the case at 1612 in FIG. 16B, in which the project may include traveling to and/or communicating with a space station or alien outpost, for example. Alternatively still, the Game Play Grid and the projects carried out thereon may have historical significance or fanciful or mythical references, such as shown at 1614 in FIG. 16C. For example, projects may include mythical quests or the famous journeys of ancient works. Game Play Grids and projects may even represent journeys of the imagination or the mind, as shown at 1616 in FIG. 16D. Many other possibilities exist and may readily be implemented within the context of the present inventions. The Game Play Grid, therefore, is not to be limited by the examples shown and described herein.

Figure 17:
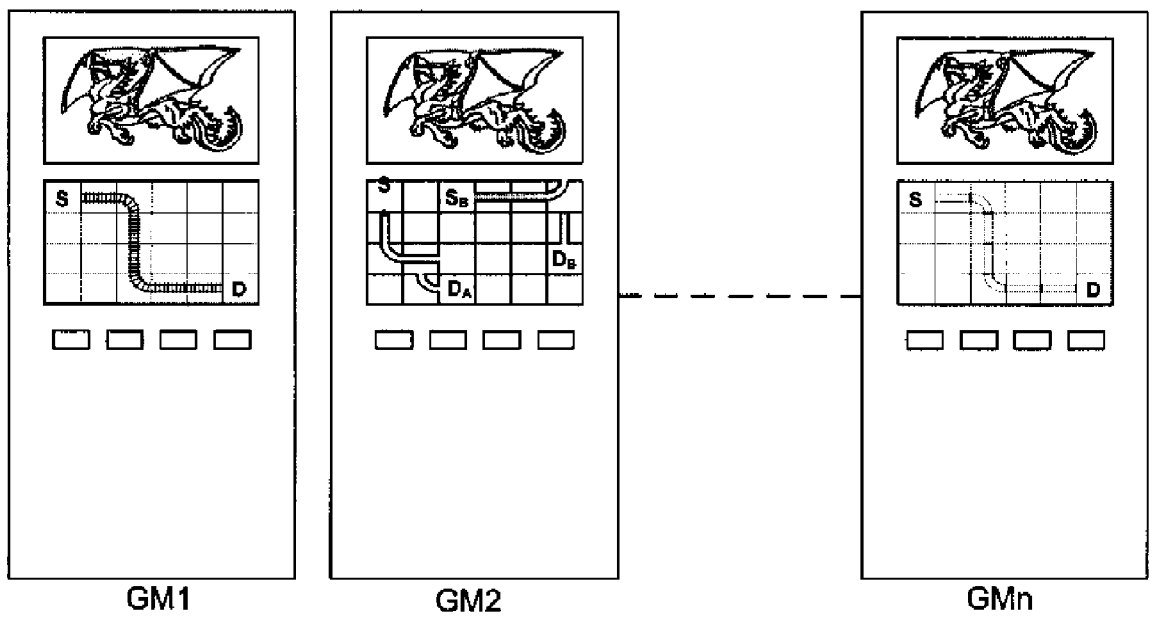
FIG. 17 shows several dual display gaming machines coupled to a network, to illustrate further aspects of embodiments of the present invention.

FIG. 17 shows several dual display gaming machines coupled to a network, to illustrate further aspects of embodiments of the present invention. When considering gaming machines having two displays, the top screen may display elements that illustrate or animate the act as it unfolds, while the bottom screen may allow the player to interact with the game, select his or her bets from the Palettes of Betting Opportunities and to activate the bet button. One or both of the displays may display the Game Play Grid, or may display multiple Game Play Grids. Multiple gaming machines running electronic games according to an embodiment of the present invention may be coupled to one another via a local and/or wide area network. Each of the gaming machines (e.g., GM1, GM2, . . . , GMn) may be running the same multi-act electronic game or different multi-act electronic games. Alternatively still one or more of the gaming machines (GM1, GM2, . . . , GMn) may be running a multi-act game according to an embodiment of the present invention, while others of the gaming machines may be running different (e.g., non multi-act) games altogether. Alternatively still, the gaming machines (GM1, GM2, . . . , GMn) may each be running multi-act games that appear different, but may all be running multi-act games that adhere to the same storyboard. For example, as shown in FIG. 17, although each of the gaming machines appears to be running different multi-act games (e.g., railroad tracks, roads and pipelines), each of the multi-act games may adhere to the same three act storyboard that includes a construction first act, a testing and/or snag second act, followed by a third act that includes a denouement or resolution in which the player may be rewarded and/or informed of the results of any pending bets.

According to further embodiments, the top screen in each gaming machine may display elements that illustrate or animate the act as it unfolds. The act number being unfolded may be the result of a player playing in the network of gaming machines having won a particular bet that caused the jump to a different or higher act sequence number. In other words, other players on other gaming machines within the network of gaming machines may influence the sequence with which the acts unfold and/or other aspects of game play. The other players in the network of gaming machines may then be invited to join the act currently unfolding and place bets on the betting opportunities offered by that act, thereby creating an ad-hoc community of players on adjacent or nearby gaming machines. For example, assuming that the network of gaming machines (or a bank of gaming machines within the network of gaming machines) offers a quest game to be played on all the gaming machines in the bank, and that a player wins a prize that, in addition to credits, awards him or her the mystery bonus "Magic Sword", the story may then jump to an act entitled "Fight The Dragon." All the top screens in the bank may then display an animated dragon fight as shown in FIG. 17, thus inviting other players to join and try to place bets on the betting opportunities related to that dragon fight act, hoping to be the or a winner of that act by predicting and placing a bet on which event will eventually cause the death of the dragon (or the knight). Consequently, the quest may move from act to act according to randomly selected winnings for bets placed by players in the banks of gaming machines, thus giving the players the impression that they are controlling the unfolding of the quest or giving them an urge to play more or longer in order to have a greater chance of controlling the quest's direction.

Figure 18:
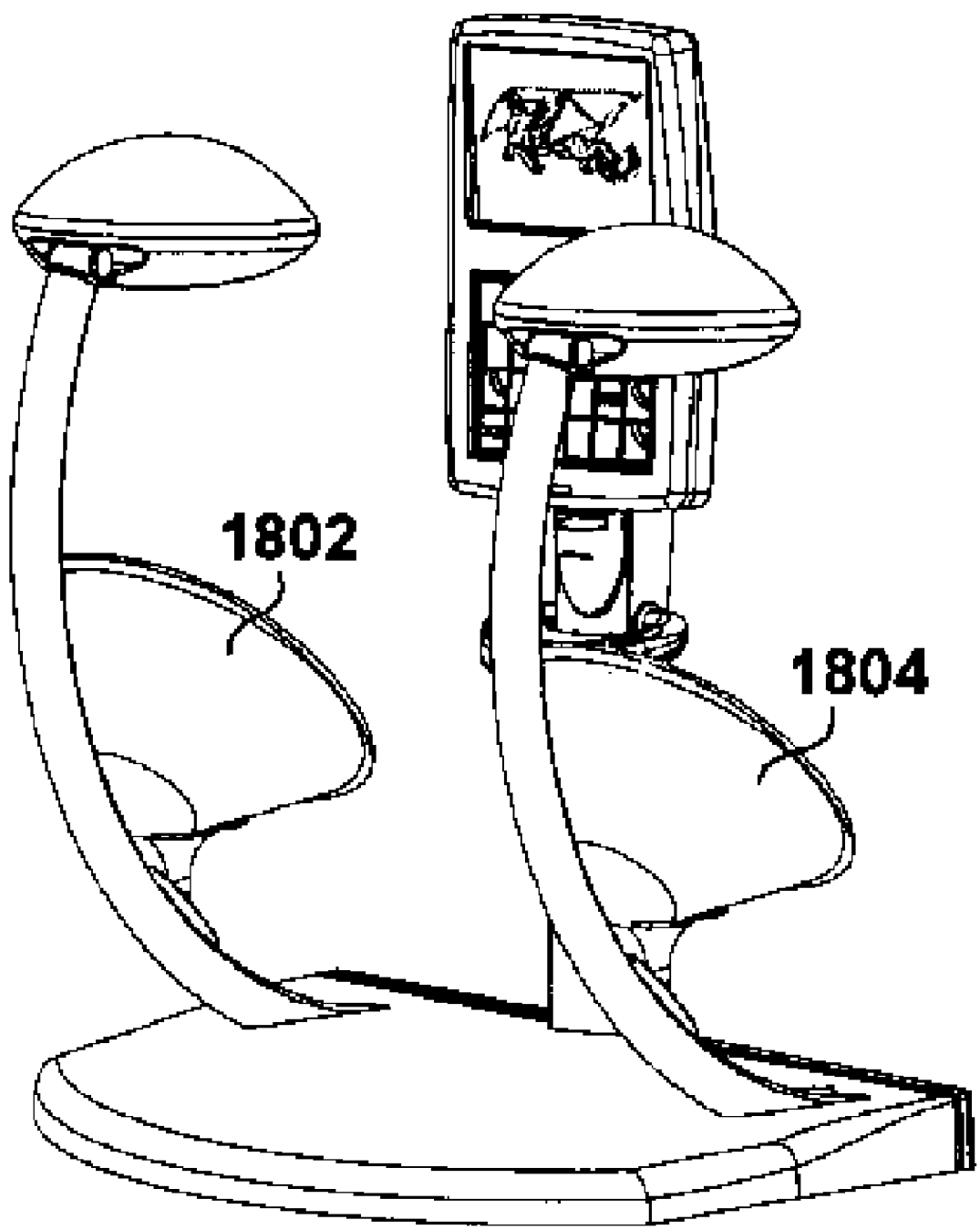
FIG. 18 shows a two player gaming machine suitable to implement embodiments of the present invention.

Multi-act games may be provided, as shown in FIG. 18 that are optimized for two players. Such two player games may require input from both players to cause the game to progress through the storyboard and/or may pit the two players against each other.

The network of gaming machines (or a bank of gaming machines within the network) may be configured to receive software downloads from a peer gaming machine in the network and/or from a central server also coupled to the network. Methods and systems for doing so are disclosed in the co-pending and commonly assigned US patent application entitled Universal Game Server, Ser. No. 10/656,631 filed on Sept. 4, 2003, attorney reference CYBS5872 and in the co-pending and commonly assigned US patent application entitled Dynamic Configuration Of A Gaming System, Ser. No. 10/789,975 filed on Feb. 27, 2004, the disclosures of which are hereby incorporated herein in their entirety. Such software downloads may include software patches, updates, updated pay tables, new acts to be inserted in the multi-act games available at the gaming machine (all subject to applicable laws and local gaming regulations), to identify but a few possibilities.

In order to preserve the simplicity of legacy electronic games, embodiments of the present invention may offer player-selectable levels of complexity. For example, a player new to this class of game may elect to play a Basic Mode with fewer features, uncluttered screens, and more straight-forward game play. In the Basic Mode, the number of available betting opportunities may be deliberately limited, so as not to detract novice players from the rhythm of the unfolding story. As players become more familiar with these Multi-Act games or desire new and greater adventures and a richer range of betting opportunities, they may choose to select Intermediate or Advanced play modes. For example, additional icons may be present in Intermediate and Advanced play modes, alerting the player of the presence of additional Palettes of Betting Opportunities, each associated with predetermined pay table or tables. Such icons may be hidden or subdued in the Basic Mode of play. Different play modes (e.g., Basic, Intermediate or Advanced) may be player-selected at each act of the multi-act games according to embodiments of the present invention.

Embodiments of the present invention may also include one or more secondary games that may be embedded into the primary multi-act game. Examples of such secondary games are disclosed in co-pending and commonly assigned US patent application Ser. No. 60/661,844 filed on Mar. 14, 2005, which is incorporated herein in its entirety. Such secondary games may allow the player to take a break from the multi-act game, play a secondary game and return to the multi-act game at the conclusion of the secondary game, without relinquishing his or her gaming machine and/or without disturbing the flow of story unfolding.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-controlled game, comprising:
   a computer;
   at least one display;
   at least one storyline that unfolds toward completion as controlled by the computer, the storyline including a plurality of acts and including a depiction of a liquid or an object attempting to travel from a predetermined source toward a predetermined destination through a conduit shown on the at least one display, the conduit including a plurality of conduit segments;
   a palette of betting opportunities appearing on the at least one display within each of the plurality of acts, the betting opportunities including a plurality of available conduit segments that are revealed to a player and on which the player may place one or more bets;
   a palette of chips, the palette of chips including chips of different denominations and being configured to enable the player to place a bet on a selected betting opportunity by placing a selected chip on a player selected one of the available conduit segments;
   an interface configured to enable the player select a betting opportunity from the palette of betting opportunities and to selectively place a bet on the selected betting opportunity, and
   a random number generator coupled to the computer and configured for randomly determining an outcome related to the bet placed subsequent to the player activating a bet command, the outcome including a conduit segment randomly selected from the palette of betting opportunities and wherein the computer-controlled game is configured to reward the player when the randomly selected conduit segment matches the player selected conduit segment.

2. The computer-controlled game of claim 1, wherein the interface is further configured to enable the player to selectively alter attributes of the selected conduit segment, and wherein the attributes include at least one of a position of a conduit segment and an orientation of a conduit segment.

3. The computer-controlled game of claim 1, wherein game play takes place at least on a first onscreen grid and on a second onscreen grid.

4. The computer-controlled game of claim 3, wherein at least one of the first and second onscreen grids includes the palette of betting opportunities.

5. The computer-controlled game of claim 3, wherein the first onscreen grid includes a game play arid in which the storyline unfolds.

6. The computer-controlled game of claim 5, wherein the plurality of acts includes a first act in which the storyline is established, a second act in which the storyline is tested and a third act in which the storyline is resolved.

7. The computer-controlled game of claim 5, wherein the game play grid is fragmented in a regular manner.

8. The computer-controlled game of claim 5, wherein the game play grid is fragmented is an irregular manner.

9. The computer-controlled game of claim 5, wherein the game play grid is three-dimensional.

10. The computer-controlled game of claim 5, wherein the game play grid includes a plurality of grid segments and wherein each of the plurality of grid segments represents a province or a territory within a map.

11. The computer-controlled game of claim 5, wherein the storyline includes an unfolding of a conduit construction project to construct the conduit from the plurality of conduit segments.

12. The computer-controlled game of claim 11, wherein the plurality of acts includes a first act, a second act and a third act and wherein the first act of the conduit construction project includes establishing the conduit construction project, the second act of the conduit construction project includes testing the constructed conduit and introducing and overcoming construction snags and the third act of the conduit construction project includes resolving the conduit construction project.

13. The computer-controlled game of claim 11, wherein the palette of betting opportunities includes a plurality of natural or man made calamities that may damage or destroy the conduit construction project.

14. The computer-controlled game of claim 13, wherein the plurality of natural or man made calamities includes at least one of a tornado, an earthquake, an explosion, lightning, and a tsunami.

15. The computer-controlled game of claim 13, wherein the plurality of natural or man made calamities is configured to be wagered upon by the player.

16. The computer-controlled game of claim 15, wherein when the computer, with input from the random number generator, determines that a natural or man made calamity upon which the player has wagered will damage the construction project, the player's wager is considered a win and the player is rewarded.

17. The computer-controlled game of claim 15, wherein the interface is configured to enable the player to bet on a selected betting opportunity of the palette of betting opportunities by at least one of a) touching the selected betting opportunity and pressing a bet button; b) placing an onscreen wagering chip on the selected betting opportunity and c) associating a selected grid segment of the game play grid with the selected betting opportunity and pressing a bet button.

18. The computer-controlled game of claim 1, wherein the interface is further configured to enable the player to manipulate the conduit one segment conduit at a time.

19. The computer-controlled game of claim 11, wherein the plurality of acts includes a test act during which the liquid or object begins advancing towards the predetermined destination.

20. The computer-controlled game of claim 5, wherein the computer, with input from the random number generator, is configured to randomly place the conduit segments in the game play grid and to enable the player to modify the placement of the conduit segments in the game play grid to complete the conduit and wherein the player earns a reward when the liquid or object successfully advances through the completed conduit from the predetermined source to the predetermined destination.

21. The computer-controlled game of claim 1, wherein at least one of the plurality of conduit segments is faulty, which causes leakage or inefficient transportation when the conduit is completed and which causes the player to earn a smaller reward than would be the case if none of the plurality of conduit segments were faulty.

22. The computer-controlled game of claim 1, wherein incorrectly aligned or missing conduit segments halt an advance of the liquid or object, which causes failure of the conduit and the player to earn no reward.

23. The computer-controlled game of claim 5, wherein the interface further enables the player to issue a rotate command that is configured to enable the player to rotate misaligned conduit segments in the game play grid.

24. The computer-controlled game of claim 5, wherein the interface further enables the player to issue a draw command that is configured to enable the player to replace missing or misaligned conduit segments with new conduit segments in the game play grid.

25. The computer-controlled game of claim 1, wherein the storyline includes a concurrent construction of more than one conduit.

26. The computer-controlled game of claim 5, wherein the storyline is configured to enable the player to attempt to fix missing or incorrectly aligned conduit segments within the game play grid only within a predetermined time period.

27. The computer-controlled game of claim 26, wherein the predetermined time period is the time it takes the liquid or object to travel from the predetermined source to the predetermined destination.

28. The computer-controlled game of claim 5, further comprising a published pay table stored in the computer and wherein the interface is further configured to enable the player to place side wagers on one or more designated game play grid segments such that when a random layout of the conduit segments on the game play grid causes a conduit segment to pass through one or more of the designated game play grid segments, the player's side wager is considered a win and the player is given a reward based on the published pay table.

29. The computer-controlled game of claim 28, wherein the interface is further configured to enable the player to designate game play grid segments on which to place a side bet by selecting a side bet wager shape from a palette of a plurality of side bet wager shapes and by applying the selected side bet wager shape to the game play grid.

30. The computer-controlled game of claim 28, wherein the interface is further configured to enable the player to define new side bet wager shapes.

31. The computer-controlled game of claim 30, wherein the at least one display is a touch screen and wherein the interface is further configured to enable the player to define the new side bet wager shapes by selecting a drawing tool from a palette of options and using the selected drawing tool on the touch screen to draw side bet wager shapes within the game play grid.

32. The computer-controlled game of claim 1, wherein each of the plurality of acts is associated with a unique setting that is displayed on the at least one display.

33. The computer-controlled game of claim 1, wherein the computer is configured to be coupled to a computer of an other computer-controlled game to form a gaming network.

34. The computer-controlled game of claim 33, wherein the computer is configured to be linked to the computer of the other computer-controlled game via a broadband connection.

35. The computer-controlled game of claim 33, wherein the interface is further configured to enable the player to invite a player of the other computer-controlled game to participate in the storyline.

36. A computer-implemented method for providing a player with an electronic game of chance, comprising the steps of:
displaying a storyline that unfolds to completion onscreen, the storyline including a plurality of acts and depicting a liquid or an object attempting to travel from a predetermined source toward a predetermined destination through an onscreen conduit that includes a plurality of conduit segments laid out on a game play grid;
providing a plurality of betting opportunities within each of the acts, the betting opportunities including a plurality of available conduit segments that are revealed to a player and on which the player may place one or more bets;
providing a palette of chips, the palette of chips including chips of different denominations and being configured to enable the player to place a bet on a selected betting opportunity by placing a selected chip on a player selected one of the available conduit segments;
providing an interface configured to enable the player to select at least one betting opportunity from the palette of betting opportunities and to selectively place a bet on the selected betting opportunity;
providing a random-number generator, and
controlling an unfolding of the onscreen storyline and determining an outcome of the bet responsive to random numbers generated by the random number generator subsequent to the player activating a bet command, the outcome including a conduit segment randomly selected from the palette of betting opportunities and wherein the computer-controlled game is configured to reward the player when the randomly selected conduit segment matches the player selected conduit segment.

37. The computer-implemented method of claim 36, wherein the interface is further configured to enable the player to selectively alter attributes of the selected conduit segment, and wherein the attributes include at least one of a position of a conduit segment and an orientation of a conduit segment.

38. The computer-implemented method of claim 36, further comprising laying out at least the predetermined source and the predetermined destination on the at least one display prior to enabling the player to place the bet.

39. The computer-implemented method of claim 38, further comprising enabling the player to bet on whether a conduit spanning from the predetermined source to the predetermined destination will be successfully completed.

40. The computer-implemented method of claim 36, further comprising enabling the player to bet on whether randomly drawing a new conduit segment from a menu of available conduit segments will successfully replace a missing, faulty, or incorrectly aligned conduit segment.

41. The computer-implemented method of claim 36, further comprising enabling the player to bet on whether a selected one of a plurality of natural or man made calamities will damage the onscreen conduit.

42. The computer-implemented method of claim 41, wherein the natural or man made calamities include at least one of a tornado, an earthquake, an explosion, lighting and a tsunami.

43. The computer-implemented method of claim 36, wherein the game play grid includes a plurality of game play grid segments and wherein the method further includes a step of enabling the player to place side wagers on one or more designated game play grid segments such that when a random layout of the conduit segments on the game play grid causes a conduit segment to pass through one or more of the designated game play grid segments, the player's side wager is considered a win and the player is given a reward based on a published pay table.

44. The computer-implemented method of claim 36, further comprising an animation step that displays changes to conduit segments that have been altered responsive to bets by the player and the random number generator.

45. The computer-implemented method of claim 36, further comprising a step of enabling the player to rotate misaligned conduit segments.

46. The computer-implemented method of claim 36, further comprising inviting an other player of an other gaming machine to participate in the storyline over a gaming network, the other gaming machine including a primary and a non-primary display, whereupon the other player participates in the storyline on the non-primary display while continuing to participate in an independent storyline of their own on the primary screen.

* * * * *